June 14, 1955   R. B. BLACKMAN ET AL   2,710,720
ARTILLERY COMPUTER

Filed Oct. 28, 1943   10 Sheets-Sheet 1

INVENTORS R. B. BLACKMAN
H. W. BODE
BY
*W. D. Dawson*

ATTORNEY

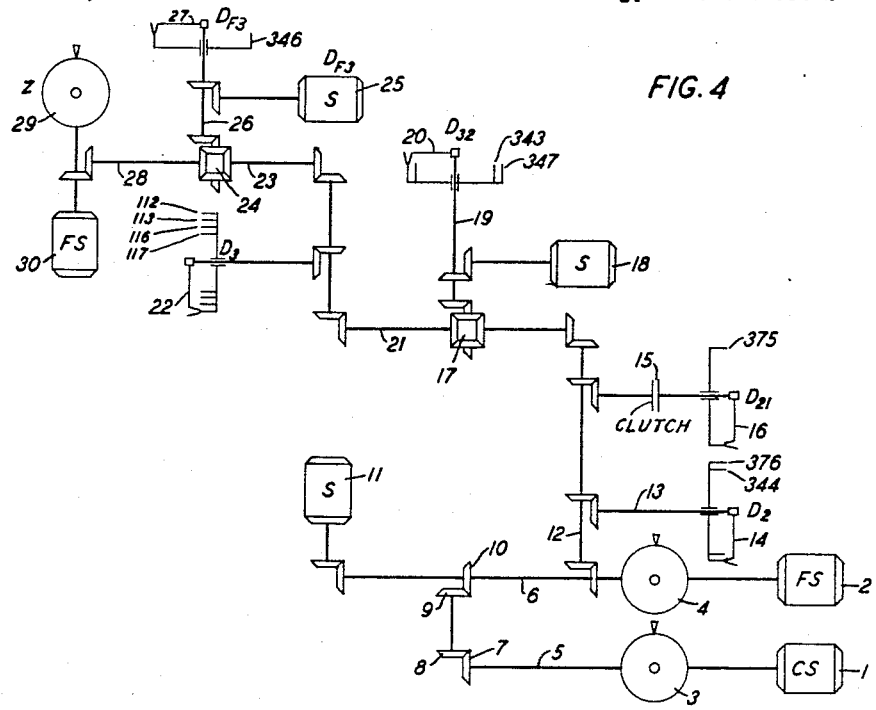

June 14, 1955 R. B. BLACKMAN ET AL 2,710,720
ARTILLERY COMPUTER
Filed Oct. 28, 1943 10 Sheets-Sheet 3

INVENTORS
R. B. BLACKMAN
H. W. BODE
BY
W. F. Dawson
ATTORNEY

June 14, 1955  R. B. BLACKMAN ET AL  2,710,720
ARTILLERY COMPUTER
Filed Oct. 28, 1943  10 Sheets-Sheet 4
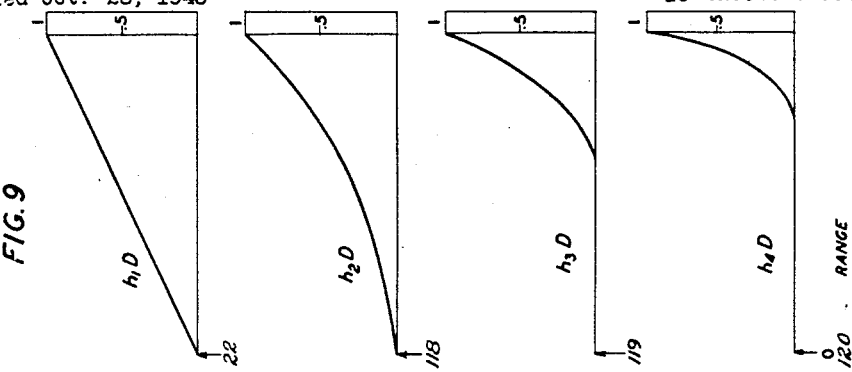
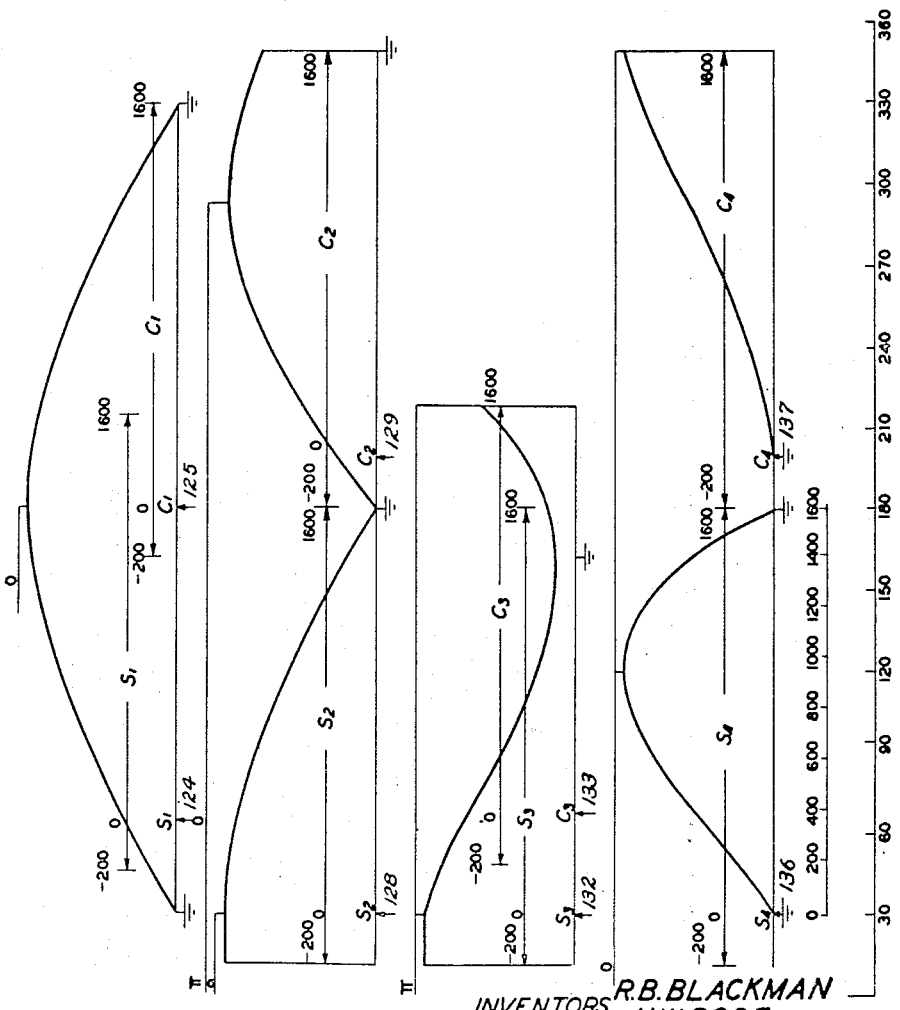
INVENTORS R.B. BLACKMAN
H.W. BODE
BY
ATTORNEY

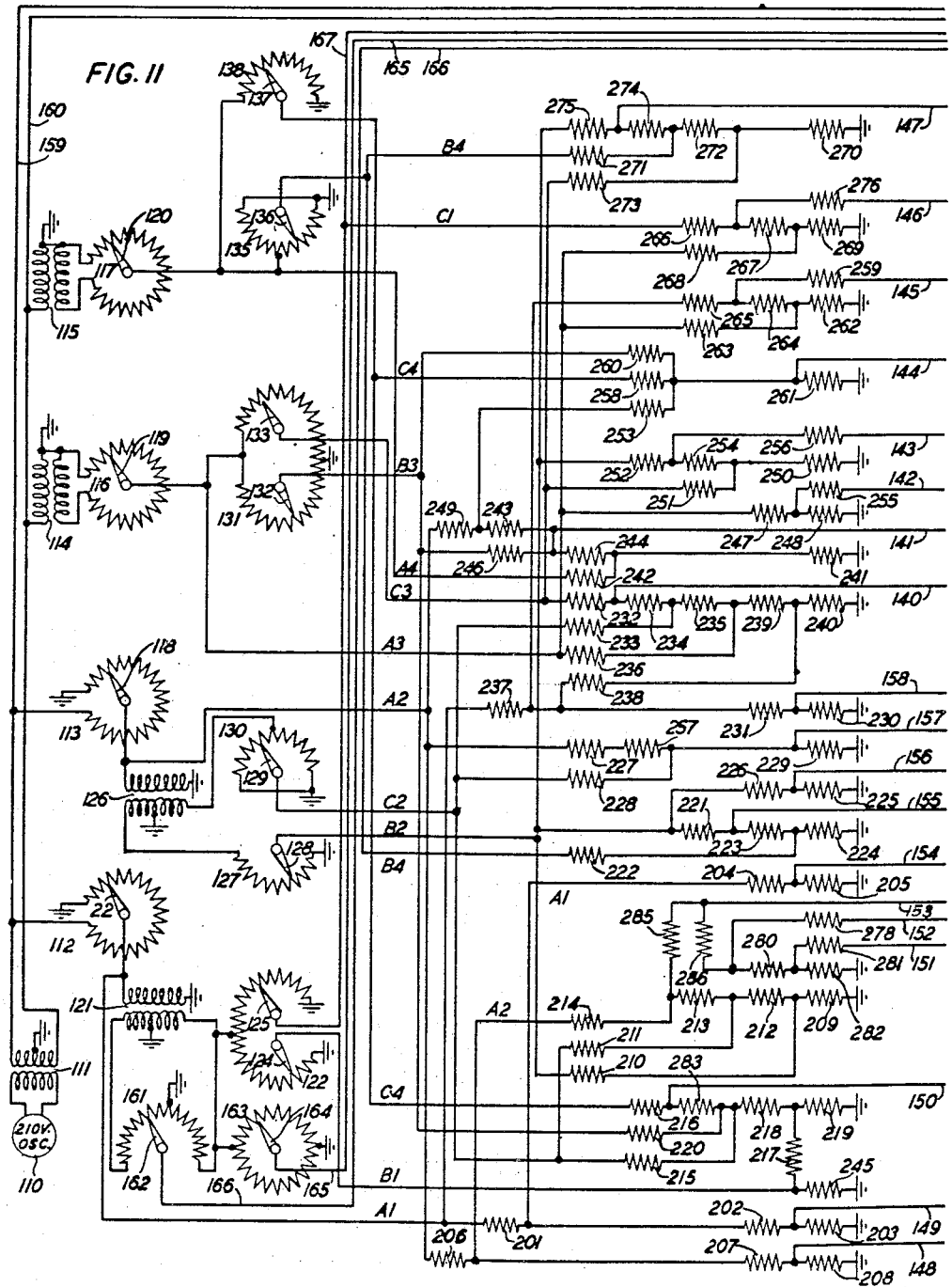

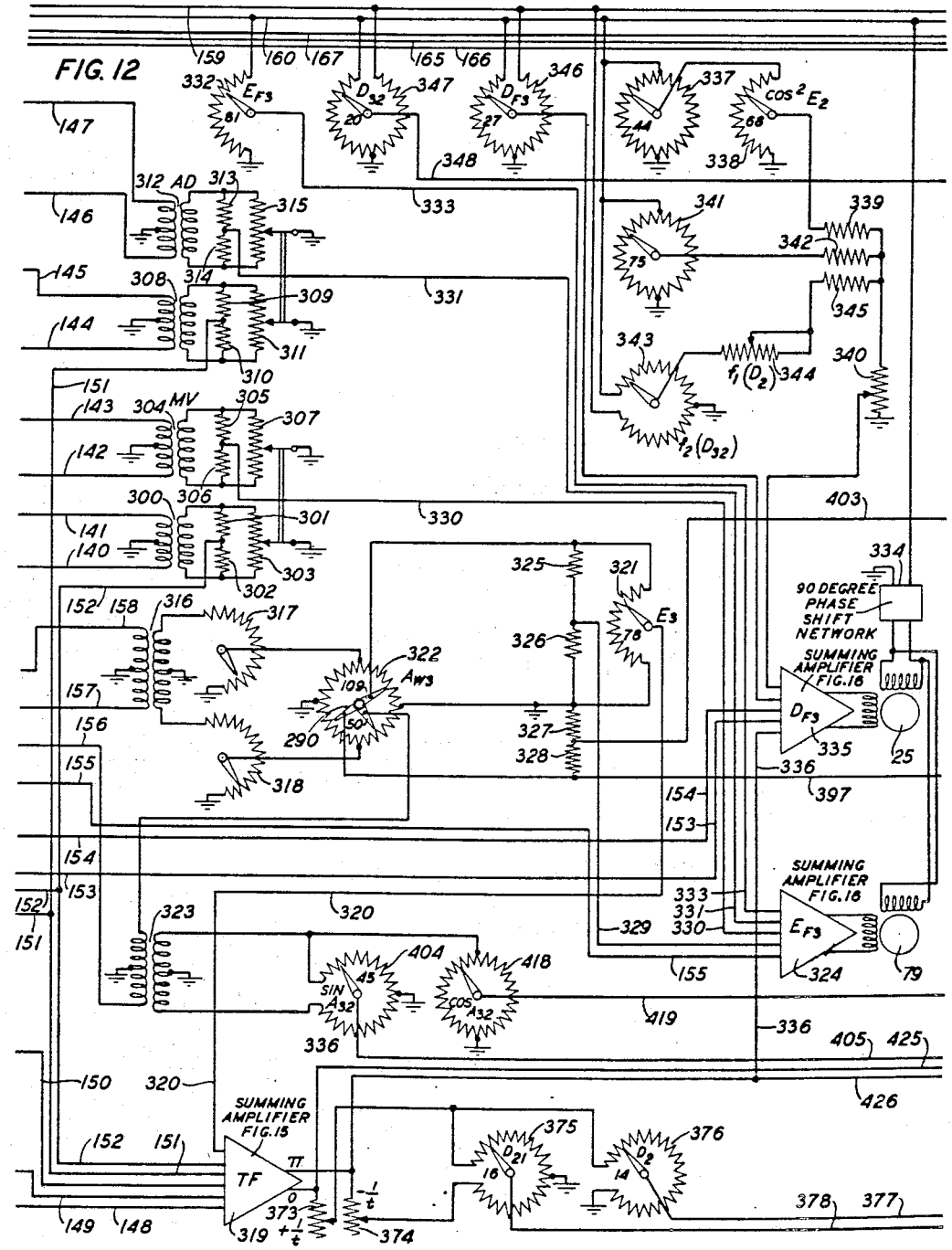

June 14, 1955 R. B. BLACKMAN ET AL 2,710,720
ARTILLERY COMPUTER
Filed Oct. 28, 1943 10 Sheets-Sheet 8

INVENTORS: R. B. BLACKMAN
H. W. BODE
BY U. L. Dawson
ATTORNEY

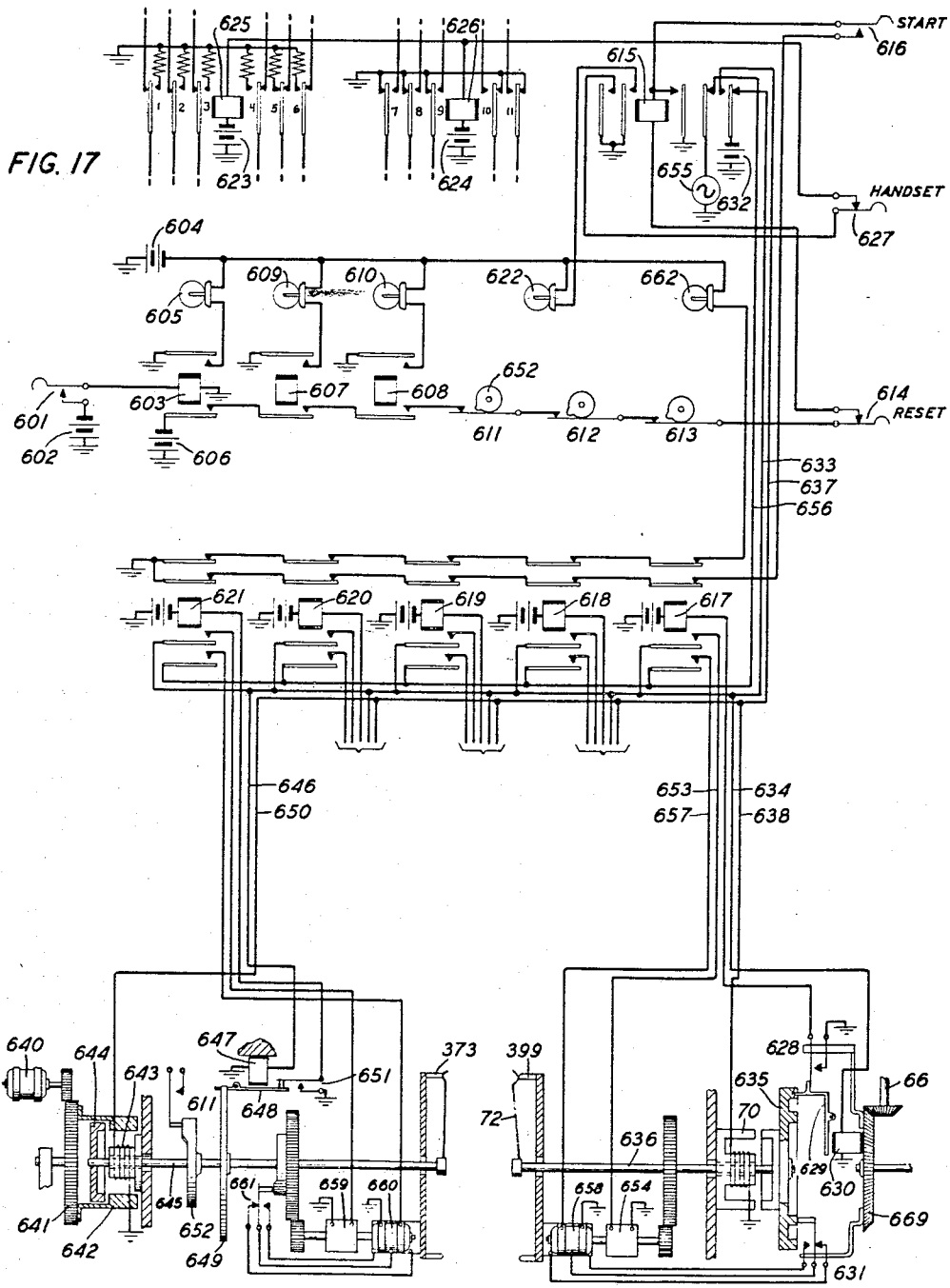

United States Patent Office 2,710,720
Patented June 14, 1955

2,710,720
ARTILLERY COMPUTER

Ralph B. Blackman, Cranford, N. J., and Hendrik W. Bode, New York, N. Y., assignors to Bell Telephone Laboratories, Incorporated, New York, N. Y., a corporation of New York Application October 28, 1943, Serial No. 508,052

32 Claims. (Cl. 235—61.5)

This invention relates to antiaircraft artillery computers and particularly to computers in which some of the data are represented by electrical quantities.

The object of the invention is a method and means for directing artillery fire to the future position of a moving target.

A feature of the invention is a computing system in which the increments in the data from a predetermined past instant to the present instant are registered and used to predict the increments in the data from the present instant to some future time.

Another feature of the invention is a one plus method of computation, that is, the values of the data at the present instant are continuously registered and the increments in these data are computed, the data for the future position being made up of the registered data plus the computed increments.

Another feature of the invention is a method and means of computation by finite differences in which the absolute changes in the observed data during one timed interval are used to predict the absolute changes in the data during the predicted time interval from the present to the future position of the target.

Another feature of the invention is a method and means of computing the position of the target in rectangular coordinates having a moving origin at the present position of the target and an orientation related to the direction of the line of sight.

Another feature of the invention is a plurality of voltage sources respectively varying with functions related to the predicted position of the target from which desired fractions of these voltages may be obtained which when added together will produce voltages proportional to the ballistic corrections required in the computations.

A further feature of the invention is a method and means of computing the dead time correction directly from the coordinates of the present and the predicted positions of the target and not, as heretofore, from the rate of change in the computed value of the time of flight.

The movement of the target from some past instant $t_1$, when the target was at the position $P_1$, to the present time $t_2$, when the target is at the position $P_2$, is continuously measured. The elapsed time interval from the past instant $t_1$ to the present instant $t_2$, and the increments in the measured data during this elapsed time interval, are registered. Thus, as, in effect, the computer remembers what the movement of the target has been since the time $t_1$, the instant $t_1$ may conveniently be called the "memory point." If the gun be fired at the present instant, the shell will reach the target at some future time $t_3$, after the lapse of the corrected time of flight of the shell. The increments in the coordinates of the position of the target during the time of flight of the shell will be to the increments in the coordinates during the elapsed time as the time of flight is to the elapsed time interval. Under the control of the observations, the computer selects a time of flight, properly corrected for dead time, and produces voltages proportional to the predicted coordinates of the target at the predicted point $P_3$. The computer also selects a virtual target $P_v$ for the gun and produces voltages proportional to the coordinates of this virtual target corrected for ballistic effects and the parallax from the point of observation to the gun, to give a point of burst $P_b$. The computer compares the voltages relating to $P_3$ with the voltages relating to $P_b$, and, if there is a difference, adjusts the selected time of flight and the selected virtual target, properly corrected, until the difference is reduced to zero and $P_3$ coincides with $P_b$. The values of the coordinates of the future position $P_3$ are then correct and may be transformed into firing data and transmitted to the guns. When observing a moving target the computer is continuously selecting and comparing these values and continuously sending firing data to the guns.

In the drawings:

Fig. 1 diagrammatically shows in plan the geometrical relations;

Fig. 2 diagrammatically shows in elevation the geometrical relations;

Fig. 3 diagrammatically shows the time distance relations of the flight of the projectile;

Fig. 4 diagrammatically shows the mechanism involved in the computation of range;

Fig. 5 diagrammatically shows the mechanism involved in the computation of azimuth angle;

Fig. 6 diagrammatically shows the mechanism involved in the computation of elevation angle;

Fig. 9 shows certain functions of slant range;

Fig. 10 shows certain functions of elevation angle;

Figure 13:
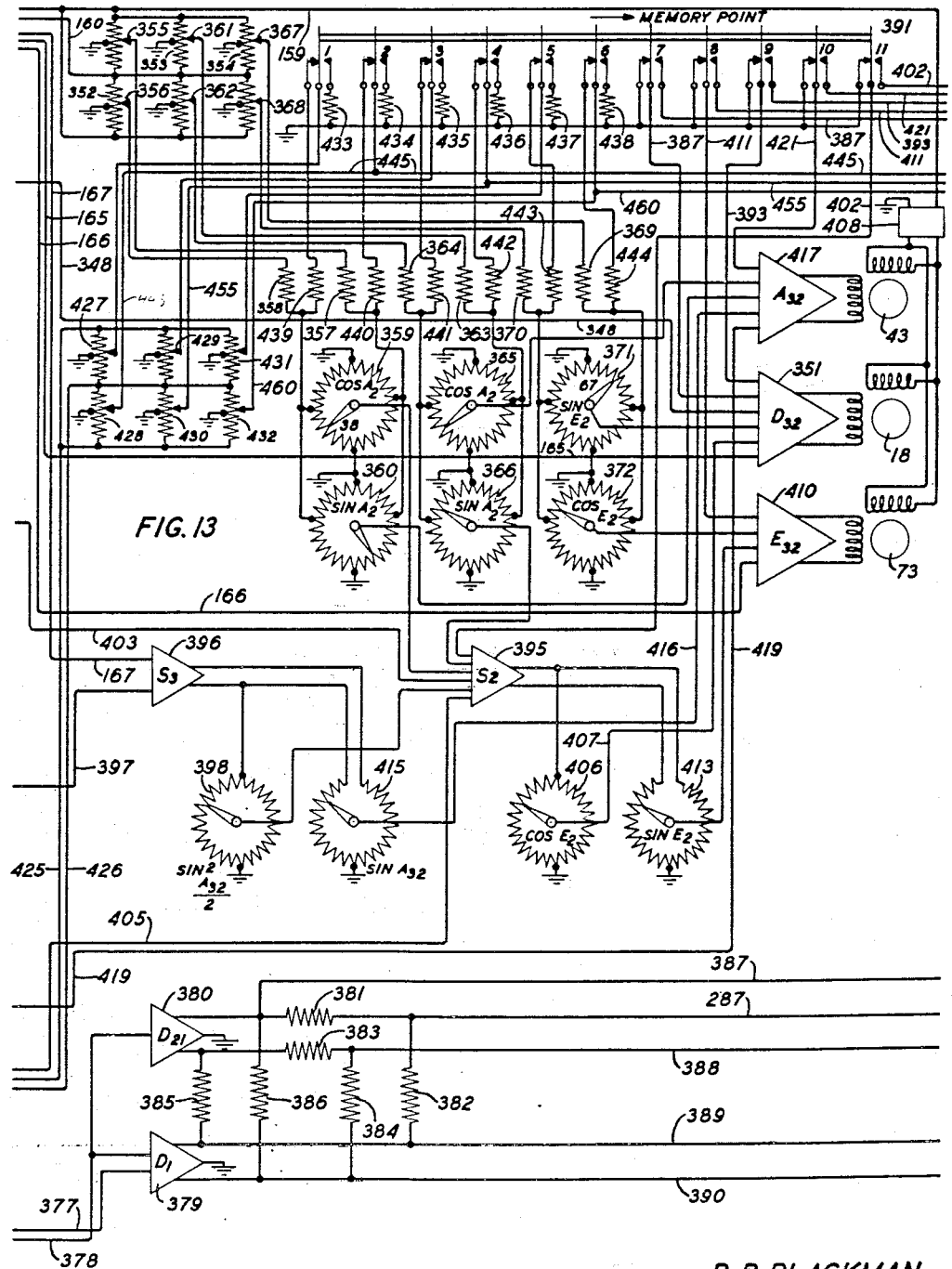
Figure 14:
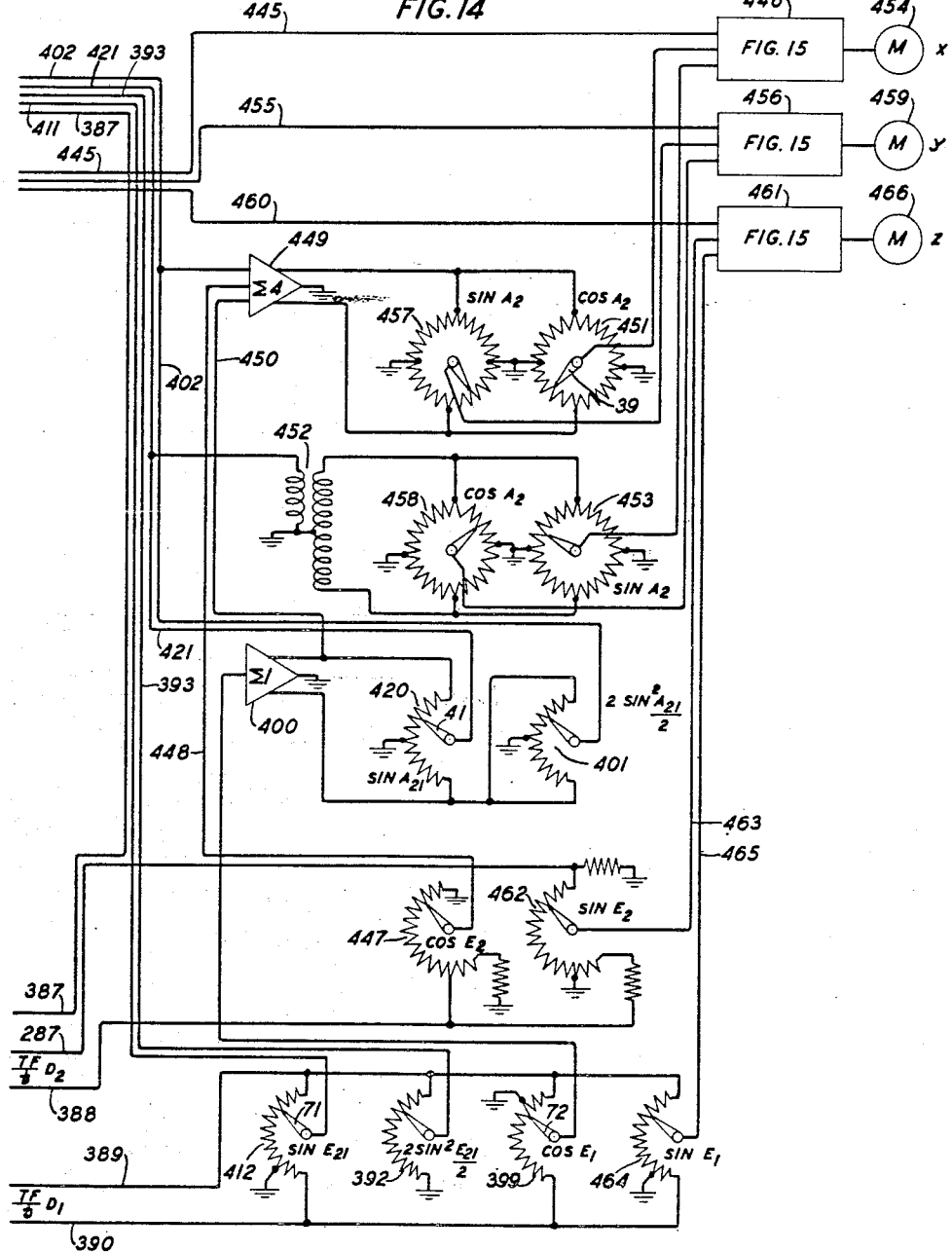
Figure 15:
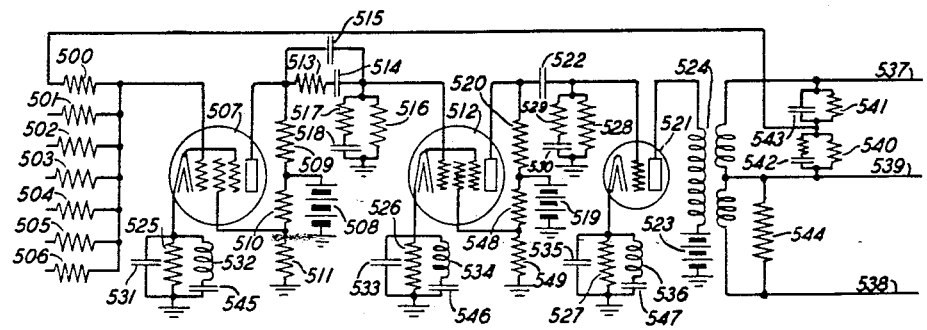
Figure 16:
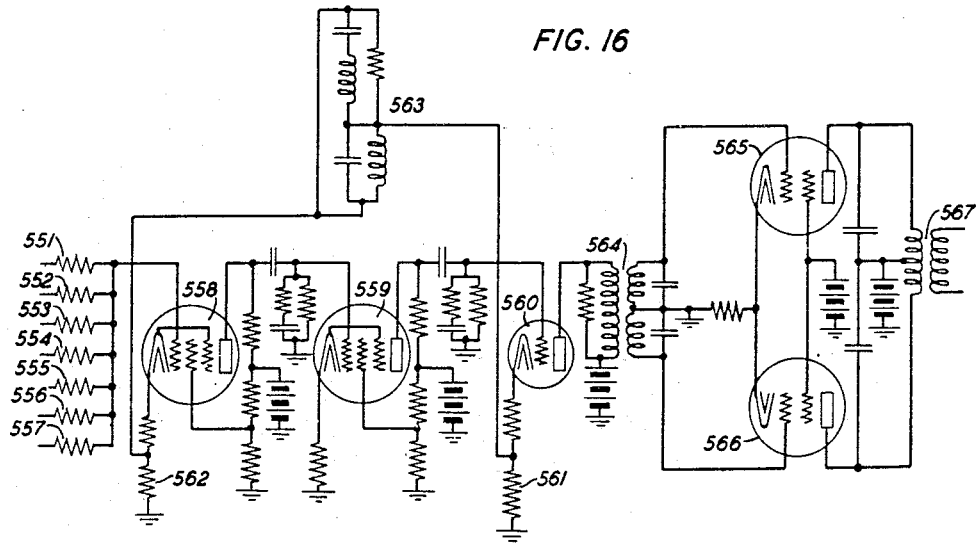

Fig. 11 schematically shows circuits for computing ballistic corrections;

Fig. 12 schematically shows circuits for computing $D_{F3}$ and $E_{F3}$ and dead time correction;

Fig. 13 schematically shows circuits for computing $D_{32}$, $A_{32}$, $E_{32}$;

Fig. 14 schematically shows circuits indicating when the target has diverged from the predicted course;

Fig. 15 schematically shows a summing amplifier used in Figs. 12, 13, 14;

Fig. 16 schematically shows the servo-motor control used in Figs. 12 and 13; and Fig. 17 schematically and diagrammatically shows the supervisory system.

The following symbols will be used in discussing the basis of the computations:

D = slant distance
E = angular height
A = angle of azimuth $x$, $y$, $z$ rectangular coordinates (north, east, up) at observing point These symbols will be used with single subscripts.

1. To designate values with respect to the observation station corresponding with the point $P_1$ occupied by the target t seconds in the past (past position or "memory point"). $T = t_2 - t_1$, 2. To designate values with respect to the observation station corresponding with the point $P_2$ occupied by the target at the present time, 3. To designate values with respect to the gun corresponding with the point $P_3$ which will be occupied by the target at a time TF seconds in the future (future position). $TF = t_3 - t_2$, TF = time of flight of the projectile,
$t_d$ = dead time, $Z$ = fuze setting in seconds (equals TF when $t_d=0$).

Literal subscripts: W for wind, $p$ for parallax, F for firing values.

Double subscripts denote differences, $D_{21}=D_2-D_1$, $A_{WG}=A_W-A_G$, $A_{W3}=A_W-A_3$.

Quadrant elevation is a special name for $E_F$.

Superelevation is a special name for $E_{F3}=E_F-E_3$.

Figure 1:
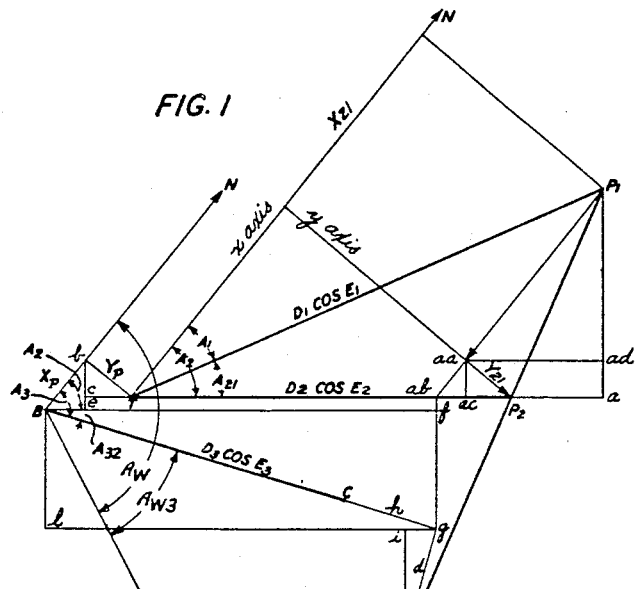

Fig. 1 shows the projection on a horizontal plane of the course of the target $P_1$, $P_2$, $P_3$ the observing instrument or tracker T, the battery B and the point C which is the point in space to which, neglecting superaltitude the gun must be pointed and the fuze set so that allowing for an increase $h$ in horizontal range and a deflection $d$ due to wind, drift and other ballistic effects, the shell will burst at $P_3$, the future position of the target. The points $P_1$, $P_2$, $P_3$ respectively correspond with the positions of the target at the past time or "memory point," the present time, and the predicted future time. Assuming that the target moves at uniform speed in a straight line, the line segments $P_1$–$P_2$, and $P_2$–$P_3$, will be in the ratio of $t$, the elapsed time, to TF, the predicted time, or time of flight of the shell.

The target is brought under observation at some past time and is kept continuously under observation. By means of known optical, sonic or radio instruments, the azimuth angle A of the target with respect to some arbitrary axis, say the north-south direction, is continuously measured, say in a clockwise direction, together with the angular height E, above the horizontal and the slant distance D.

At a selected past time when the target is at the past position or "memory point" $P_1$, the angular height $E_1$ is registered and the measurements of the increments in the angular height $E_{21}$, the azimuth angle $A_{21}$, and the distance $D_{21}$ commence.

At the moving present time, $t$ seconds after the selected past time, the target is at the moving present position $P_2$, having the coordinates $A_2$, $E_2$, $D_2$.

In the present system a time of flight TF of the shell is selected and from the measured increments in the data during the known elapsed time, $t$, and the time of flight, TF, the coordinates of the future position of the target may be computed. Also the azimuth angle and the quadrant elevation of the gun and the fuze number which should cause a hit at the future position are assumed in the same coordinates. The two values of coordinates are compared and if there is a disagreement the proper elements in the data are automatically changed to reduce the disagreement to zero. The corrected values of azimuth angle, quadrant elevation and fuze number are used in firing the shell.

The distances measured from the memory point to the present position are to the predicted distances as the elapsed time $t$ is to the time of flight TF. Thus, if a voltage be generated having an amplitude proportional to a measured distance and this amplitude is modified in the ratio $$\frac{TF}{t}$$

the modified voltage will be proportional to the predicted distance.

INCREMENT IN AZIMUTH ANGLE $A_{32}$

The predicted increment in azimuth angle is computed by means of the linear increments in a horizontal axis perpendicular to the direction to the present position of the target and having the origin at the present position.

Fig. 1 shows the projections on a horizontal plane of the gun or battery B, the observing device or tracker T and the course of the target $P_1$, $P_2$, $P_3$.

The gun parallax or distance from B to T is measured in rectangular coordinates $X_p$, $Y_p$ having the origin at B and convenient directions, such as north, south and east, west.

If $D_1$ is the slant distance and $E_1$ the angular height of the target at the memory point, the horizontal projection of this distance will be $D_1 \cos E_1$. Similarly, the horizontal projection of the slant distance to the present position is $D_2 \cos E_2$, and the horizontal projection of the slant distance from the battery B to the virtual point of aim C is $D_3 \cos E_3$.

In Fig. 1, lines $b$–$e$, $f$–$g$, $i$–$P_3$, $P_1$–$a$, $aa$–$ac$, are drawn perpendicular to $TP_2$; lines $c$–T, B–$f$, $l$–$g$, $aa$–$ad$, $P_2$–$a$, are drawn parallel to $TP_2$. BN and TN are in the direction of zero azimuth angle, thus angle $NTP_1=A_1$; angle $NTP_2=A_2$; angle $NBC=A_3$. Using the convention $A_{21}=A_2-A_1$, angle $P_1TP_2=A_{21}$; angle $fBC=A_{32}$. Also, as $bT$ is perpendicular to TN, angle $$bTc=\frac{\pi}{2}-A_2$$

and angle $cbT=A_2$. As $Bf$ is parallel to $TP_2$ angle $NBe=A_2$. The deflection $d$ is perpendicular to the line of fire, thus angle $$BgP_3=\frac{\pi}{2}$$

and, as angle $fBg$ = angle $Bgl$, angle $$igP_3=\frac{\pi}{2}-A_{32}$$

and angle $iP_3g=A_{32}$.

The projection of $TP_1$ on a perpendicular to $TP_2$ will equal $P_1$–$a$, which is $D_1 \cos E_1 \sin A_{21}$, and is a measured value.

The projection $b$–$c$ of $Y_p$ is $Y_p \cos A_2$, the projection $b$–$e$ of $X_p$ is $X_p \sin A_2$, thus the projection $c$–$e$ is $X_p \sin A_2 - Y_p \cos A_2$.

The projection $f$–$g$ is $(D_3 \cos E_3+h) \sin A_{32}$.

The projection $P_3$–$i$ is $d \cos A_{32}$.

The total predicted projection from $P_2$ to $P_3$ is $X_p \sin A_2 - Y_p \cos A_2 + (D_3 \cos E_3+h) \sin A_{32} + d \cos A_{32}$.

Let $$S_3=D_3 \cos E_3+h \qquad (1)$$

Then $$\frac{TF}{t}(D_1 \cos E_1 \sin A_{21}) =$$
$$S_3 \sin A_{32} + d \cos A_{32} + X_p \sin A_2 - Y_p \cos A \qquad (2)$$

Figure 2:
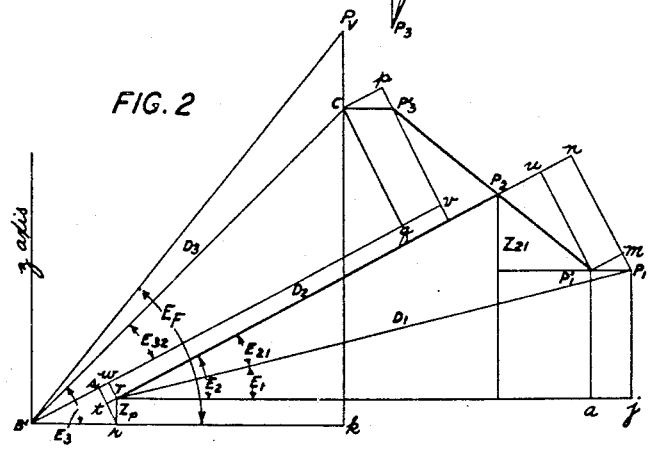

In Fig. 2, the points $P_1'$, $P_2$, $P_3'$, are the projections of the past, present and predicted positions of the target, B' and T are the projections of the battery and tracker, on the vertical plane containing the tracker and the present position of the target.

Point C with respect to B', and point $P_1$ with respect to T are not projections, but show the true relationship with respect to slant distance and angular height of the point C with respect to the battery B', and of the memory point $P_1$ with respect to the tracker T. In other words, the vertical plane containing $P_1$ and T is rotated about a vertical line through T till this plane coincides with the plane containing $P_2$ and T. The vertical plane containing B and C is rotated about a vertical line through B until it is parallel to the plane containing $P_2$ and T, then translated into coincidence with the plane containing $P_2$ and T. Lines $CP_3'$, $P_1'P_1$, $Tj$, and $B'k$ are horizontal; thus angle $P_1Tj=E_1$; angle $P_2Tj=E_2$; angle $P_1TP_2=E_{21}$; angle $CB'k=E_3$. Lines $Cp$, $B'v$, $tT$, $P_1'm$ are parallel to $TP_2$, thus angle $pCP_3'=E_2$, $CB'v=E_{32}$, $mP_1'P_1=E_{21}$. Lines $tT$ and $P_{2n}$ are prolongations of $TP_2$. Lines $sr$, $wT$, $Cq$, $pv$, $uP_1'$, $nP_1$ are perpendicular to $TP_2$, and lines $Tr$, $Ck$, $P_1'a$, $P_1j$ are vertical. Thus angle $$tTr=\frac{\pi}{2}-E_2$$

and angle $trT=E_2$.

In Figs. 1 and 2, the horizontal distance T–$a$ is evidently $D_1 \cos E_1 \cos A_{21}$. In Fig. 2, the distance T–$j$ is $D_1 \cos E_1$. Thus the horizontal distance $P_1'P_1$ is $D_1 \cos E_1 - D_1 \cos E_1 \cos A_{21}$, and applying the relationship $$1 - \cos A_{21} = 2 \sin^2 \frac{A_{21}}{2}$$

the horizontal distance $P_1'P_1$ is $$D_1 \cos E_1 . 2 \sin^2 \frac{A_{21}}{2}$$

In Fig. 2, the horizontal distance $B'k$ is $D_3 \cos E_3$, which from Equation 1 equals $S_3 - h$.

In Fig. 1 the horizontal distance $l-g$ equals $S_3 \cos A_{32}$. The horizontal distance $i-g$ equals $d \sin A_{32}$. Thus, the horizontal distance $l-i$ equals $S_3 \cos A_{32} - d \sin A_{32}$.

In Fig. 2 the horizontal distance $B'-k$ equals $D_3 \cos E_3$, thus the horizontal line segment $C-P_3'$ equals $S_3 \cos A_{32} - d \sin A_{32} - D_3 \cos E_3$. Applying the relationship $$\cos A_{32} = 1 - 2 \sin^2 \frac{A_{32}}{2}$$

$C-P_3'$ equals $$S_3 - S_3 . 2 \sin^2 \frac{A_{32}}{2} - d \sin A_{32} - D_3 \cos E_3$$

and from Equation 1, $S_3 - D_3 \cos E_3 = h$, thus the line segment $C-P_3'$ equals $$h - S_3 . 2 \sin^2 \frac{A_{32}}{2} - d \sin A_{32}$$

INCREMENT IN ANGULAR HEIGHT $E_{32}$

The increment in angular height $E_{32}$ may be computed by projecting the line segments $P_1'P_2$ and $P_2P_3'$ on an axis perpendicular to $P_2T$ passing through $P_2$.

The horizontal line segment $P_1'P_1$ as before is $$D_1 \cos E_1 . 2 \sin^2 \frac{A_{21}}{2}$$

thus the line segment $P_1 m$ is $$D_1 \cos E_1 . 2 \sin^2 \frac{A_{21}}{2} \cdot \sin E_2$$

The line segment $P_1 n$ is $D_1 \sin E_{21}$, thus the line segment $mn$ is $$D_1 \sin E_{21} - D_1 \cos E_1 . 2 \sin^2 \frac{A_{21}}{2} \cdot \sin E_2$$

and this is the projection of a measured distance.

The projection $P_3'p$ is the horizontal line segment $CP_3'$ multiplied by $\sin E_2$ and thus equals $$\left(h - S_3 . 2 \sin^2 \frac{A_{32}}{2} - d \sin A_{32}\right) \sin E_2$$

The projection $Cq$ equals $D_3 \sin E_{32}$.

From Fig. 1, the horizontal distance from B to T is $Be$ plus $cT$ or $X_p \cos A_2 + Y_p \sin A_2$, and this equals $B'r$ in Fig. 2. Thus $rs$ equals $(X_p \cos A_2 + Y_p \sin A_2) \sin E_2$. The projection $rt$ equals $Z_p \cos E_2$.

Thus the projection of the line segment $P_3'P_2$ is $$D_3 \sin E_{32} + \left(S_3 . 2 \sin^2 \frac{A_{32}}{2} - h + d \sin A_{32}\right) \sin E_2 + (X_p \cos A_2 + Y_p \sin A_2) \sin E_2 - Z_p \cos E_2$$

and this is the projection of the predicted distance.

The measured distances are to the predicted distances as $t$ to $TF$, thus the measured distances multiplied by $$\frac{TF}{t}$$

may be equated to the predicted distances, hence $$\frac{TF}{t}\left(D_1 \sin E_{21} - D_1 \cos E_1 . 2 \sin^2 \frac{A_{21}}{2} \sin E_2\right) =$$

$$D_3 \sin E_{32} + \left(S_3 . 2 \sin^2 \frac{A_{32}}{2} - h + d \sin A_{32}\right) \sin E_2 +$$

$$(X_p \cos A_2 + Y_p \sin A_2) \sin E_2 - Z_p \cos E_2 \quad (3)$$

INCREMENT IN SLANT RANGE

The increment in slant range $D_{32}$ may be computed with allowance for the gun parallax by projecting the line segments $P_1'P_2$ and $P_2P_3'$ to the slant distance $TP_2$.

In Fig. 2 the distance $Tn$ equals $D_1 \cos E_{21}$; the distance $$P_1'm, \text{ or } nu \text{ equals } \left(D_1 \cos E_1 . 2 \sin^2 \frac{A_{21}}{2}\right) \cos E_2$$

the distance $TP_2$ is $D_2$ thus, the projection $$P_2 u \text{ equals } D_1 \cos E_{21} - D_1 \cos E_1 . 2 \sin^2 \frac{A_{21}}{2} \cos E_2 - D_2$$

or $$-\left(D_2 - D_1 \cos E_{21} + D_1 \cos E_1 . 2 \sin^2 \frac{A_{21}}{2} \cos E_2\right)$$

and this is a measured value.

In Fig. 2, the distance $TP_2$ equals $D_2$; the distance $B'q$ equals $D_3 \cos E_{32}$; the distance $$qv \text{ equals } \left(h - S_3 . 2 \sin^2 \frac{A_{32}}{2} - d \sin A_{32}\right) \cos E_2$$

the distance $B's$ equals $(X_p \cos A_2 + Y_p \sin A_2) \cos E_2$; the distance $Tt$ or $sw$ equals $Z_p \sin E_2$, thus the projection $$P_2 v \text{ equals } D_2 - D_3 \cos E_{32} - \left(h - S_3 . 2 \sin^2 \frac{A_{32}}{2} - d \sin A_{32}\right) \cos E_2 +$$

$$(X_p \cos A_2 + Y_p \sin A_2) \cos E_2 + Z_p \sin E_2$$

or $$-(-D_2 + D_3 \cos E_{32}) + \left(S_3 . 2 \sin^2 \frac{A_{32}}{2} - h + d \sin A_{32}\right) \cos E_2 +$$

$$(X_p \cos A_2 + Y_p \sin A_2) \cos E_2 + Z_p \sin E_2$$

and this is a predicted value.

Thus, $$\frac{TF}{t}\left(D_2 - D_1 \cos E_{21} + D_1 \cos E_1 . 2 \sin^2 \frac{A_{21}}{2} \cos E_2\right) =$$

$$D_3 \cos E_{32} - \left(S_3 . 2 \sin^2 \frac{A_{32}}{2} - h + d \sin A_{32}\right) \cos E_2 -$$

$$(X_p \cos A_2 + Y_p \sin A_2) \cos E_2 - Z_p \sin E_2 - D_2 \quad (4)$$

Let $$S_2 = \frac{TF}{t}\left(D_1 \cos E_1 . 2 \sin^2 \frac{A_{21}}{2}\right) + S_3 . 2 \sin^2 \frac{A_{32}}{2} -$$

$$h + d \sin A_{32} + X_p \cos A_2 + Y_p \sin A_2 \quad (5)$$

Substituting the identities $$\cos E_{21} = 1 - 2 \sin^2 \frac{E_{21}}{2}$$

and $$\cos E_{32} = 1 - 2 \sin^2 \frac{E_{32}}{2}$$

and rearranging from Equations 2, 3 and 4 are obtained the following equations for the increments in azimuth angle, angular height and slant range.

$$S_3 \sin A_{32} + d \cos A_{32} + X_p \sin A_2 - Y_p \cos A_2 -$$

$$\frac{TF}{t}(D_1 \cos E_1 \sin A_{21}) = 0 \quad (6)$$

$$D_3 \sin E_{32} + S_2 \sin E_2 - Z_p \cos E_2 - \frac{TF}{t}(D_1 \sin E_{21}) = 0 \quad (7)$$

$$D_{32} - D_3 . 2 \sin^2 \frac{E_{32}}{2} - S_2 \cos E_2 - Z_p \sin E_2 -$$

$$\frac{TF}{t} \cdot D_1 . 2 \sin^2 \frac{E_{21}}{2} - \frac{TF}{t} \cdot D_{21} = 0 \quad (8)$$

The measured values of slant range are continuously supplied by the usual transmitters on the observation instrument to the receivers 1, 2, Fig. 4, which may conveniently be in the form of coarse and fine self-synchronous receivers. The movements of receivers 1, 2 may be indicated on suitable dials 3, 4. The shaft 5 of the coarse receiver 1 is connected to the shaft 6 of the fine receiver 2 by suitable mechanism, such as the gears 7, 8 and 9, 10. As the self-synchronous receivers 1, 2 cannot transmit appreciable torque without impairing the accuracy of the indications, a torque amplifier 11 controlled in known manner by the receivers 1, 2 assists in turning the shaft 6.

The shaft 6 drives shaft 12.

Shaft 12 drives shaft 13 continuously moving the potentiometer wiper 14 to select a voltage proportional to the slant range $D_2$ to the present position of the target.

At some desired time in the past, that is, at the "memory point" the clutch 15 was operated. The clutch 15 may conveniently be a magnetic clutch controlled by a push-button or switch located at some convenient point, as shown in Fig. 17. After the clutch 15 is operated, the shaft 12 can move the potentiometer wiper 16 to select a voltage proportional to $D_{21}$, the increment in slant range from the selected past time or "memory point" to the present time.

The shaft 12 drives one gear of the differential gear 17.

The servo-motor 18 is controlled by the computing circuit, as explained later, to drive the shaft 19 moving the wiper 20 proportionately to the increment in slant range $D_{32}$ from the present position to the future position, and driving one gear of the differential gear 17.

The differential gear 17 adds the rotations of the shafts 12 and 19 to produce a rotation of the shaft 21, and a movement of the wiper 22 proportional to the range $D_3$ to the point of aim.

The shaft 21 drives the shaft 23 rotating one gear of the differential gear 24.

The servo-motor 25 is controlled by the computing circuit, as explained later, to drive the shaft 26, moving the wiper 27 proportionately to the correction for fuze number $D_{F3}$, and driving one gear of the differential gear 24.

The differential gear 24 adds the rotations of the shafts 23 and 26 to produce a rotation of the shaft 28 proportional to the fuze number range $D_F$, which is in the form of the fuze number Z. The shaft 28 produces an indication of the number on the dial 29, and drives the self-synchronous transmitter 30 to send the fuse number to the fuse setter.

The measured values of the azimuth angle A are transmitted from the observing instrument by the usual coarse and fine self-synchronous transmitters to the coarse 31 and fine 32 self-synchronous receivers, Fig. 5, which indicate the angle on the dials 33, 34 and, assisted by the torque amplifier 35, rotate the shaft 36 proportionately to the angle $A_2$.

The shaft 36 drives the shaft 37 moving the wipers 38 and 39 in proportion to the present value $A_2$ of the azimuth angle.

The clutch 40 which may be a magnetic clutch as shown in Fig. 17, is operated by a push-button or switch at the predetermined past time and moves the wiper 41 in proportion to the increment $A_{21}$ in the angle.

The shaft 37 drives one gear of the differential gear 42.

The servo-motor 43 is controlled by the computing circuit, as explained later, moving the wipers 44, 45 proportionately to the computed increment $A_{32}$ in the angle, and driving one gear of the differential gear 42.

The differential gear 42 adds the rotations of the shaft 37 and servo-motor 43 to produce a rotation of the shaft 46 proportional to $A_3$.

The direction to which the wind is blowing has an azimuth $A_W$, which is put in by the handwheel 47, which rotates the dial 48, and one gear of the differential gear 49. Another gear of the differential gear 49 is driven by the shaft 46. The differential gear 49 subtracts the rotations of the handwheel 47 and the shaft 46, moving the wiper 50 in proportion to the difference $A_{W3} = A_W - A_3$ in the azimuth angles.

The difference angle $A_{F3} = A_F - A_3$ would normally be added to the future position angle $A_3$ to give the angle of train $A_F$. This addition would require another differential gear and, as the correction is small compared to the angle, may be avoided by using the voltage selected by the wiper 50 to assist in the control of the servo-motor 43, in such manner that the shaft 46 is moved in proportion to $A_F$. The rotation of the shaft 46 is transmitted by the coarse 51, and fine 52, self-synchronous transmitters to the battery.

Figure 6:
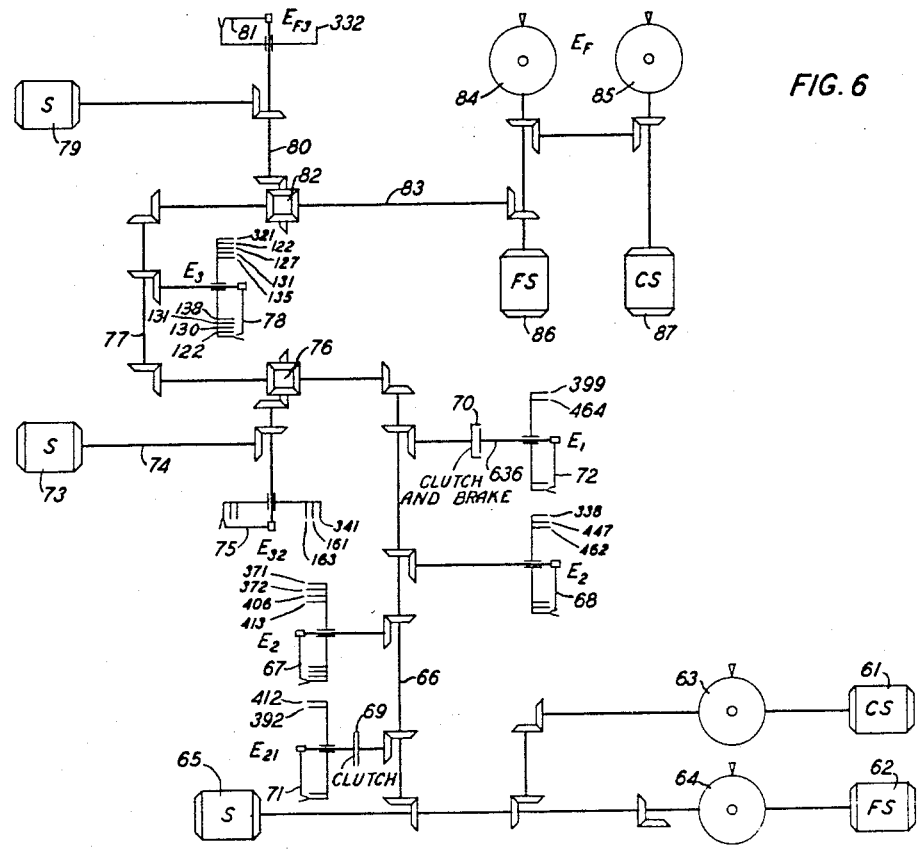

The measured values of the angular height E are transmitted from the observing station by the usual coarse and fine self-synchronous transmitters to the coarse 61 and fine 62 self-synchronous receivers, Fig. 6, which indicate the angle on the dials 63, 64 and, assisted by the torque amplifier 65, rotate the shaft 66 proportionately to the angle $E_2$.

The shaft 66 moves the wipers 67, 68 in proportion to the angular height $E_2$ to the present position of the target.

At the predetermined past time or memory point the clutch 69 which may be a magnetic clutch as shown in Fig. 17, is operated, say by a push-button or switch, moving the wiper 71 in proportion to the increment $E_{21}$ in the angular height. At the same instant the clutch and brake 70, shown in greater detail in Fig. 17, is operated, stopping the wiper 72 at a point where the wiper 72 selects a voltage proportional to the cosine of the angular height $E_1$ at the past or memory point.

The servo-motor 73 is controlled by the computing circuit, as explained later, to move the shaft 74 and wiper 75 proportionately to the predicted increment $E_{32}$ in the angular height from the present to the future position of the target.

The shaft 66 rotates one gear, the shaft 74 another gear of the differential gear 76. The differential gear 76 adds these rotations, moving the shaft 77 and wiper 78 proportionally to the angular height $E_3$ to the future position of the target.

The servo-motor 79 is controlled by the computing circuit, as described later, to rotate the shaft 80 and wiper 81 through the superelevation angle $E_{F3}$ to the corrected future position.

The shaft 77 drives one gear, the shaft 80 another gear of the differential gear 82. The differential gear 82 adds these rotations rotating the shaft 83 proportionally to the quadrant elevation $E_F$. The rotation of the shaft 83 is indicated on the dials 84, 85 and is transmitted by the fine 86 and coarse 87 self-synchronous transmitters to the battery.

The wipers in Figs. 4, 5 and 6 are shown associated with potentiometer windings concentric with the driving shafts and, as indicated, more than one potentiometer winding may be arranged concentrically with a given shaft.

The potentiometer windings or cards may conveniently be made from a thin sheet of insulating material closely and uniformly wound with insulated resistance wire. One edge of the card should be substantially straight, and the resistance wire bared to provide a good rubbing contact with the wiper. The other edge of the card is cut to produce a variation in width which will produce the desired variation in the voltage selected by the wiper.

Let $w(x)$ = the width of card at some point $x$
$r$ = resistance of wire per unit length
$n$ = turns of wire per unit length of card
$r_m$ = total resistance of wound card
$r(x)$ = resistance of card to point $x = r_m \cdot f(x)$ Then $$r(x) = \int_0^x 2nr w(x) \cdot dx$$

$$w(x) = \frac{1}{2nr} \cdot \frac{dr(x)}{dx}$$

$$= \frac{r_m}{2nr} \cdot \frac{d}{dx} f(x) \qquad (9)$$

Thus, for a sinusoidal variation of the selected voltage $$w(x) = \frac{r_m}{2nr} \cdot \frac{d}{dA} \sin A = \frac{r_m}{2nr} \cdot \cos A$$

Similarly, for a cosinusoidal variation of voltage $$w(x) = \frac{r_m}{2nr} \cdot \sin A$$

To obtain a voltage variation of the form ½ (1—cos$A$) the potentiometer winding will vary in resistance per unit length with sin A. Similarly, with the identity $$\sin^2 \frac{A}{2}$$

the potentiometer winding will vary in resistance per unit length of card with sin A. Thus the windings for these functions will have the same variation of resistance per unit length of card as for cos A. For cos A, zero degrees has unit positive voltage, ninety degrees has zero voltage, one eighty degrees has unit negative voltage and two seventy degrees has zero voltage. For ½ (1—cos $A$) or $$\sin^2 \frac{A}{2}$$

zero degrees has zero voltage, ninety degrees has half positive voltage, one eighty degrees has unit positive voltage and two seventy degrees has half positive voltage. Thus these functions may be obtained from potentiometer windings having the same variation of resistance per unit length by changing the points of application of voltage. The $$\sin^2 \frac{A}{2}$$

is more accurate for small angles than ½ (1—cos $A$).

Figure 7:
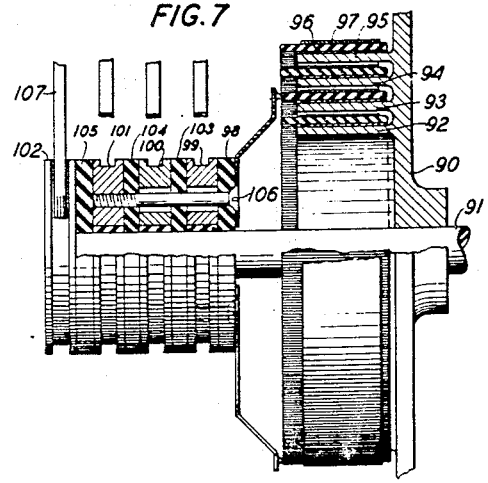

The potentiometer cards may conveniently be mounted as shown in Fig. 7. A stationary base 90 which may form a bearing for the shaft 91 is formed with a series of concentric ribs or buttresses 92, 93, 94, 95 separated by annular spaces. If the base 90 be made of conductive material, strips of insulating material 96 may be placed on each rib. The potentiometer cards are then wrapped around over the material 96. Another strip of material 97 which may be insulating material, may be wrapped tightly around over the card, drawn tight, and the ends fastened together or small wedges may be inserted between the strip and the card. The ends of the windings may be led out to suitable terminals supported by the base 90.

The wipers may be mounted on an insulating disc 98 concentric with the shaft 91. Slip rings 99, 100, 101, 102 are mounted concentric with shaft 91, but insulated therefrom, alternating with insulating discs 98, 103, 104, 105. The respective brushes are secured by screws, such as screw 106, passing through clearance holes in the intervening slip rings, and threaded into the corresponding slip ring. The complete assembly of wipers, slip rings and insulators may be keyed to the shaft 91. The brushes, such as 107, connect the wipers to any desired circuit.

For the smaller potentiometers, the slip ring discs may have seven clearance holes and one threaded hole, while, for the larger potentiometers, the discs may have eleven clearance holes and one threaded hole. A couple of insulated pins are usually forced into two of the clearance holes to center the assembly. Thus, the smaller disc has a capacity of six brushes, and the larger assembly a capacity of ten brushes. The brushes may be of unequal lengths and respectively associated with cards retained in different annular spaces, or two or more of the brushes may be of the same length and associated with two or more cards retained end to end in the same annular space. The zero points of the cards are appropriately offset to agree with the zero positions of the associated brushes. This type of potentiometer assembly is disclosed in United States Patent 2,403,989, issued July 16, 1946, to R. F. Mallina.

In cases where the voltage selected is proportional to an angle, such as the angular height, which cannot exceed two right angles, two potentiometer cards may be placed end to end in the same annulus, and two wipers respectively in contact with the windings and mounted at any desired angle apart, may be brought out to separate slip rings.

Also, if a winding has a resistance varying per unit length with a cosinusoidal function so that the voltage selected by a wiper varies with a positive sinusoidal function, the voltage selected by a wiper displaced 180 degrees from the first wiper will vary with a negative sinusoidal function, the voltage selected by a wiper having an angular lead of 90 degrees will vary as a positive cosinusoidal function and the voltage selected by a wiper having an angular lag of 90 degrees will vary with a negative cosinusoidal function.

The ballistic data relating to a gun and its ammunition are usually tabulated in terms of the slant range and angular height of the future position of the target. The various corrections are tabulated for a series of values of slant range for each of a series of values of the angular height.

A mathematical analysis of the tabulated ballistic data shows that the various corrections may be expressed as functions of the slant range D and angular height E to the future position of the target. These functions are linear combinations of twelve functions, four functions of slant range, four functions of slant range times a quantity resembling a sinusoidal variation and four functions of slant range times a quantity resembling a cosinusoidal variation.

Thus all of the ballistic corrections may be matched by a function of the general form $$F(D,E) = A_0 + A_1 h_1(D) + B_1 h_1(D) s_1(E) + C_1 h_1(D) c_1(E) \\ + A_2 h_2(D) + B_2 h_2(D) s_2(E) + C_2 h_2(D) c_2(E) \\ + A_3 h_3(D) + B_3 h_3(D) s_3(E) + C_3 h_3(D) c_3(E) \\ + A_4 h_4(D) + B_4 h_4(D) s_4(E) + C_4 h_4(D) c_4(E) \quad (10)$$

The constants in Equation 10 for the corrections of the time of flight and elevation angle for non-standard muzzle velocity; the corrections of the time of flight and elevation angle for non-standard air density; the corrections for cross wind and drift; and the time of flight, superelevation and fuze correction for a particular gun are given in Table 1.

Table 1

|   | Muzzle Velocity | | Air Density | | Cross Wind | Drift | TF | SE | FC |
|---|---|---|---|---|---|---|---|---|---|
|   | Time of Flight | Elevation | Time of Flight | Elevation | | | | | |
| $A_0$ | | | | | | 5.1 | | 0.80 | −.140 |
| $A_1$ | .190 | | −1.050 | | −123.4 | | 7.129 | | −.378 |
| $B_1$ | | | | | | | 1.052 | | |
| $C_1$ | | | | | 16.77 | | | | |
| $A_2$ | −1.620 | | 3.570 | | 622.0 | | 25.803 | | .729 |
| $B_2$ | | −25.80 | | −50.76 | | −198.5 | | 287.70 | .081 |
| $C_2$ | −.508 | | | | −89.0 | | −1.756 | | −.132 |
| $A_3$ | −.674 | −12.00 | .250 | −5.99 | | | | | |
| $B_3$ | 2.740 | | −1.132 | | | | −2.635 | | |
| $C_3$ | −1.480 | 28.80 | | 14.68 | | | | | |
| $A_4$ | −.435 | | | | | | | | |
| $B_4$ | | | | −7.12 | | | | 15.90 | |
| $C_4$ | | | 1.780 | | | | 3.808 | | |

In addition the fuze calibration correction FC has further corrections of —.061 times the time of flight correction of muzzle velocity and —.022 times the time of flight correction of air density.

The time of flight correction of muzzle velocity is expressed as the correction in the time of flight for 100 feet per second change in muzzle velocity.

The elevation correction of muzzle velocity is expressed as the correction in superelevation in mils (1600 mils equals 90 degrees), for 100 feet per second change in muzzle velocity.

The air density corrections are similarly expressed as corrections in time of flight and superelevation for 10 per cent change in air density.

The cross wind correction is in yards for a 60 mile per hour wind.

The drift is in yards, negative to the right of the line of fire, but the offset $A_0$ is in mils (1600 mils equals 90 degrees), clockwise.

The time of flight is in seconds, the superelevation in mils, and the fuze calibration is time of flight in seconds less fuze number.

The $A_0$ coefficients, which occur only in connection with the superelevation, fuze calibration correction and drift, are obtained by mechanically offsetting the output dials.

The $h_1(D)$, $h_2(D)$, $h_3(D)$, and $h_4(D)$ voltage functions are plotted in Fig. 9 against the range. The functions shown are the voltage functions, not the potentiometer cards. The width of the potentiometer cards, as discussed hereinabove, will vary approximately with the derivative of the function. This relationship is rigorously true only if the potentiometer is purely a potential divider, that is, when no current is drawn from the wiper. In the present case, the wipers 22, 118, 119, 120 of the range potentiometers supply current to the other potentiometers and the resistance network thus, the widths of the potentiometer cards do not vary exactly with the derivative of the voltage function, but are modified to correct for the effects of the currents drawn from the wipers.

The $s_1(E)$, $c_1(E)$, $s_2(E)$, $c_2(E)$, $s_3(E)$, $c_3(E)$, $s_4(E)$, $c_4(E)$ voltage functions are plotted in Fig. 10 against E the angular height. The angular height has been expressed in mils, where 1600 mils equals 90 degrees. The angular height will not exceed 1600 mils of elevation, and some 200 mils of depression, a total angle of about 1800 mils. If two potentiometer cards, each extending over this angle, are placed end to end as arcs of the same circle, they will occupy only 202½ degrees of the circumference of the circle. To secure a better scale factor, the cards may be spread out, say in the ratio of 5 to 3, to cover 337½ degrees, with a corresponding increase in the angular travel of the wiper. In Fig. 10 the voltage curves have been plotted against the angular height in mils and a scale of the actual circumferential angle has been added.

Like the functions $h(D)$, the functions shown in Fig. 10 are voltage functions, not potentiometer card shapes. The widths of the potentiometer cards will be the derivative of the functions shown, modified to take into account the currents drawn by the resistance network from the various potentiometer wipers.

The $s_1$ and $c_1$ functions together are a true sinusoidal function extending over 3200 mils and, as the $h_1$ function is linearly related to the range, the $c_1$ voltage will be proportional to $h_3 \cos E_3$, the horizontal range of the target in the future position.

The $s_1$ function is a sinusoidal function, not of E but of $(E_3 + 367.1)$. The positions of the wipers 124, 125 for zero angle is indicated by the small arrowheads and the complete travel of the wipers in mils is also indicated. The travel of the $s_1$ wiper overlaps the travel of the $c_1$ wiper. The voltage at the mid-point of the winding is of unity magnitude. The voltage at zero angle and at the end of the travel of the $c_1$ wiper is zero, that is, ground potential.

The $s_2$ function varies from unity voltage for the first 200 mils to zero voltage, or ground, at 1600 mils.

The $c_2$ function varies from zero at —200 mils to unit voltage at about 1073 mils, and .7863 voltage at 1600 mils. The positions of the wipers 128, 129, for zero angle, are indicated by the small arrowhead.

The $s_3$ and $c_3$ functions overlap, the $c_3$ wiper 133 being spaced only 400 mils from the $s_3$ wiper 132. The complete function varies from unit voltage at —200 mils to about 15 percent of unit voltage at 1500 mils, rising to 61 per cent of unit voltage at 2000 mils.

The $s_4$ function varies from zero voltage at zero angle to unit voltage at about 1000 mils and zero voltage at 1600 mils. The $c_4$ function rises from zero at zero angle to unit voltage at 1600 mils. The positions of the wipers 136, 137 for zero angle, are indicated by the small arrowheads.

In Fig. 11 current from a suitable source 110, such as an oscillator, is supplied by the tapped transformer 111 to the potentiometer windings 112, 113 and to the primary windings of the transformers 114, 115. In order to equalize the loads on the two sections of the secondary winding of transformer 111, the windings 112, 113 are connected across one section, while the transformers 114, 115 are connected across the other section. The secondary windings of transformers 114, 115 are respectively connected across the potentiometer windings 116, 117.

Figure 8:
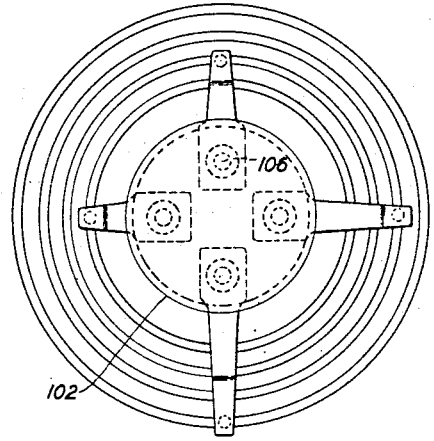
Figs. 7 and 8 show a plurality of potentiometer windings and wipers.

The windings 112, 113, 116, 117 are indicated on Fig. 4 in association with the wiper 22. The wipers 118, 119, 120 may be associated with the wiper 22, similarly to the four wipers shown in Fig. 8. The zero points of the respective windings 112, 113, 116, 117 will, of course, be offset to correspond with the zero positions of the wipers 22, 118, 119, 120. The wipers 118, 119, 120 are moved, like the wiper 22, by the shaft 21, Fig. 4, proportionally to the slant range $D_3$.

The winding 112 is of uniform resistance, so that the voltage selected by the wiper 22 is proportional to $h_1(D)$, Fig. 9, that is, to $D_3$.

The voltage selected by the wiper 22 is supplied to the primary winding of transformer 121.

The secondary winding of transformer 121 is in two sections, and one section is connected across the potentiometer winding 122, which has a sinusoidal variation of resistance to produce the voltage variations $s_1(E)$ and $c_1(E)$ of Fig. 10.

The voltage selected by wiper 22 is proportional to $h_1(D)$; the voltage selected by wiper 124 is proportional to $h_1(D)s_1(E)$; and the voltage selected by the wiper 125 is proportional to $h_1(D)c_1(E)$, the second, third and fourth terms of the first line of Equation 10. The term $h_1(D)c_1(E)$ is proportional to the horizontal range to the point of aim.

The potentiometer winding 113 has a resistance variation producing a voltage varying with the function $h_2(D)$, Fig. 9. The voltage selected by the wiper 118 is applied to the primary winding of transformer 126. The secondary winding of transformer 126 is in two sections, and one section is connected across the potentiometer winding 127. The winding 127 has a variation in resistance such as to produce a voltage varying with $s_2(E)$, Fig. 10. The voltage selected by the wiper 128 is thus proportional to $h_2(D)s_2(E)$.

The winding 130 has a resistance variation such as to produce a voltage varying with the function $c_2(E)$, Fig. 10. The second section of the secondary winding of transformer 126 is connected to a tap in the winding 130 and to the two ends of this winding. The voltage selected by the wiper 129 is thus proportional to $h_2(D)c_2(E)$.

The voltage selected by the wiper 119 is supplied to the potentiometer winding 131. This winding has a resistance variation such that the voltages selected by the wipers 132, 133 vary with the functions $s_3(E)$ and $c_3(E)$, Fig. 10. The voltages selected by the wipers 132, 133 are thus proportional to $h_3(D)s_3(E)$ and $h_3(D)c_3(E)$, respectively.

The potentiometer winding 135 is arranged like the winding 130, the voltage selected by the wiper 120 being applied to a tap in the winding 135, the ends of winding 135 being grounded. The voltage selected by the wiper 120 is also applied to the potentiometer winding 138. The resistances of the windings 135, 138 vary in such manner as to produce voltages varying with the functions $s_4(E)$ and $c_4(E)$, Fig. 10. The voltages selected by the wipers 136, 137 are thus proportional to $h_4(D)s_4(E)$ and $h_4(D)c_4(E)$. The wipers 124, 125, 128, 129, 132, 133, 135, 137, together with wiper 78, Fig. 12, are moved by shaft 77, Fig. 6, proportionally to $E_3$.

For convenience of description, the voltages will be designated by their characteristic constants, as follows: $A_1$ wiper 22, $B_1$ wiper 124, $C_1$ wiper 125; $A_2$ wiper 118, $B_2$ wiper 128, $C_2$ wiper 129; $A_3$ wiper 119, $B_3$ wiper 132, $C_3$ wiper 133; $A_4$ wiper 120, $B_4$ wiper 136, $C_4$ wiper 137.

As the secondary winding of transformer 111 is center tapped, the voltage from oscillator 110 is available in two phases, 180 degrees apart. Thus, these phases may be selected so as to represent the positive and negative values of the quantities in Table 1.

The phase of the voltage supplied to the potentiometer windings 112, 113, may be designated as 0 phase, and the phase of the voltage supplied to the primary windings of transformers 114, 115 as $\pi$ phase. Transformer 114 is so poled that the voltage from the secondary winding is of $\pi$ phase, while transformer 115 is so poled that the voltage from the secondary winding is of 0 phase.

The phases of the voltages representing the terms in Equation 10 will then be as shown in Table 2.

*Table 2*

| Term | Function | Phase | Wiper |
|---|---|---|---|
| $A_1$ | $h_1(D_3) = \dfrac{D_3}{12500}$ | 0 | 22 |
| $B_1$ | $h_1(D_3)s_1(E_3) = \dfrac{D_3}{12500}\sin(E_3+367.1)$ | 0 | 124 |
| $C_1$ | $h_1(D_3)c_1(E_3) = \dfrac{D_3}{12500}\cos E_3$ | 0 | 125 |
| $A_2$ | $h_2(D)$ | 0 | 118 |
| $B_2$ | $h_2(D)s_2(E)$ | 0 | 128 |
| $C_2$ | $h_2(D)c_2(E)$ | $\pi$ | 129 |
| $A_3$ | $h_3(D)$ | $\pi$ | 119 |
| $B_3$ | $h_3(D)s_3(E)$ | $\pi$ | 132 |
| $C_3$ | $h_3(D)c_3(E) = h_3(D)s_3(E+400)$ | $\pi$ | 133 |
| $A_4$ | $h_4(D)$ | 0 | 120 |
| $B_4$ | $h_4(D)s_4(E)$ | 0 | 136 |
| $C_4$ | $h_4(D)c_4(E)$ | 0 | 137 |

In Table 1, the highest accuracy is required for the time of flight, TF, superelevation SE, and fuze calibration FC corrections. Thus, for these corrections it is preferable that the voltages, as derived from a resistance network, be of the correct phase so that transformers are not required.

The signs of the functions and the phases of the voltages representing these functions are given in Table 3.

*Table 3*

| Term | TF | | SE | | FC | |
|---|---|---|---|---|---|---|
| | Sign | Phase | Sign | Phase | Sign | Phase |
| $A_1$ | + | 0 | | | | |
| $B_1$ | + | 0 | | | | |
| $C_1$ | | | | | | |
| $A_2$ | + | 0 | | | + | 0 |
| $B_2$ | | | + | 0 | + | 0 |
| $C_2$ | − | $\pi$ | | | | $\pi$ |
| $A_3$ | | | | | | |
| $B_3$ | − | $\pi$ | | | | |
| $C_3$ | | | | | | |
| $A_4$ | | | | | | |
| $B_4$ | | | + | 0 | | |
| $C_4$ | + | 0 | | | | |

The $A_1$ term in the FC correction is derived in a special manner, as explained hereinafter.

The muzzle velocity may be more or less than the standard muzzle velocity, the air density may be greater or smaller than the standard air density and the cross wind may blow from the left-hand or the right-hand. These three corrections must be available in both phases. As the accuracy required for these three corrections is not too high, the voltages of both phases may be obtained by supplying the voltage representing the correction to the primary windings of a transformer having two primary as well as two secondary windings. The secondary windings then give the voltages of both phases. The signs and phases of the voltages representing these functions are given in Table 4.

*Table 4*

| Term | Phase | MV | | AD | | Cross Wind | Drift |
|---|---|---|---|---|---|---|---|
| | | TF | SE | TF | SE | | |
| $A_1$ | 0 | + | | − | | − | |
| $B_1$ | 0 | | | | | | |
| $C_1$ | 0 | | | | + | | |
| $A_2$ | 0 | − | | + | | + | |
| $B_2$ | 0 | | − | | − | | − |
| $C_2$ | $\pi$ | − | | | | − | |
| $A_3$ | $\pi$ | | − | + | | | |
| $B_3$ | $\pi$ | + | | | | | |
| $C_3$ | $\pi$ | − | + | | + | | |
| $A_4$ | 0 | − | | | | | |
| $B_4$ | 0 | | | | − | | |
| $C_4$ | 0 | | | + | | | |

In the MVTF correction, the signs of the $A_1$, $C_2$, $A_3$ and $C_3$ terms agree with the phases of the voltages, while the signs of the $A_2$, $B_3$ and $A_4$ terms are the reverse of the phases of the voltages. The $A_1$, $C_2$, $A_3$ and $C_3$ voltages may be supplied to one primary winding of a transformer poled to produce one phase relation in the secondary windings. The $A_3$, $B_3$ and $A_4$ voltages may then be supplied to another primary winding of the same transformer poled to produce the other phase relation in the secondary windings.

Similarly, in the MVSE correction, the $A_3$ voltage is supplied to one primary winding and the $B_2$ and $C_3$ voltages to another primary winding.

A similar process of phasing is used in connection with the air density and cross wind corrections.

The phase of the drift correction is reversed in a special transformer 323 in Fig. 12 which also combines the drift correction voltage with the cross wind correction voltage.

MUZZLE VELOCITY

The normal ballistic tables are based upon an assumed standard muzzle velocity of the shell. A new gun will frequently have a muzzle velocity exceeding the standard velocity, but, with use, the erosion of the barrel causes the muzzle velocity to decrease to the standard and eventually to become less than the standard.

As a muzzle velocity differing from the standard will cause the time of flight of the shell to differ from the standard conditions, the time of flight must be corrected for a non-standard muzzle velocity.

In Fig. 11 current from wiper 133 flows through resistor 232, to resistors 234, 235, 239, 240, in series, producing a voltage proportional to $C_3$ in the connection 140.

Current from the wiper 129 flows through resistor 233 and resistors 235, 239, 240 in series, adding a voltage proportional to $C_2$ to the connection 140.

Current from the wiper 119 flows through resistor 236 and resistors 239, 240 in series, adding a voltage proportional to $A_3$ to the connection 140.

Current from the wiper 22 flows through resistors 237, 238 and resistor 240, adding a voltage proportional to $A_1$ to the connection 140.

As the four voltage sources are intercoupled by the resistors 234, 235, 239, 240, there will be a tendency for the voltages developed across these resistors to cause currents to flow back through some of the sources. These circulating currents are undesirable, and they are made small by having the resistances of the resistors 232, 233, 236, 237, 238 large compared with the resistances of the resistors 234, 235, 239, 240.

Current from wiper 132 flows through resistor 246 and resistors 244, 241 in series, producing a voltage proportional to $B_3$ in the connection 141.

Current from wiper 118 flows through resistors 249, 243, and through resistors 244, 241 in series, adding a voltage proportional to $A_2$ to the connection 141.

Current from wiper 120 flows through resistor 242, and resistor 241, adding a voltage proportional to $A_4$ to the connection 141.

The connections 140, 141 lead respectively to the ends of the primary winding of transformer 300, Fig. 12, the center of this winding being grounded. The currents flowing in the primary winding will produce currents in the secondary winding of transformer 300 varying in the required manner to correct for a non-standard muzzle velocity.

Resistors 301 and 302 in series are connected across the secondary winding of transformer 300 in parallel relationship with the winding of potentiometer 303. The wiper of potentiometer 303 is grounded and is set to the value of the muzzle velocity of the gun. The potential of the junction of resistors 301, 302 with respect to ground will then vary in proportion to the required correction.

The superelevation of the gun must also be corrected for a non-standard muzzle velocity.

Current flows from wiper 119 through resistor 247 and resistor 248, applying through resistor 255, to the connection 142, a voltage proportional to $A_3$.

Current flows from wiper 128, through resistor 252 and resistors 254, 250 in series, applying through resistor 256 to the connection 143 a voltage proportional to $B_2$.

Current flows from wiper 133 through resistor 251 and resistor 250 adding a voltage to connection 143 proportional to $C_3$.

The connections 142, 143 lead to the primary winding of transformer 304, Fig. 12 which is grounded at an intermediate tap. The resistors 305, 306 in series, and the winding of potentiometer 307 are connected across the secondary winding of transformer 304. The wiper of potentiometer 307 is grounded and adjusted to the value of muzzle velocity. The junction of resistors 305, 306 will have a potential with respect to ground varying with the desired correction. The wipers of potentiometers 303 and 307 are ganged to be adjusted simultaneously.

The resistors 255 and 256 aid in matching the impedance of the network to the impedance of transformer 304.

AIR DENSITY

The normal range tables are based upon an assumed standard structure of the air. As the barometric pressure and temperature of the air at the time of firing may deviate from the assumed conditions, the structure of the air is measured at frequent intervals and weighted average values of the density of the air supplied to the computer. The effects of a non-standard density of the air are generally similar to the effects of a non-standard muzzle velocity.

Current flows from wiper 118 through resistors 249 and 253, from wiper 137 through resistor 258 and from wiper 132 through resistor 260, the combined currents flowing through resistor 261 and applying a voltage to connection 144 made up of a voltage proportional to $A_2$, a voltage proportional to $C_4$ and a voltage proportional to $B_3$.

Current flows from wiper 22 through resistors 237, 265 and resistors 264, 262 applying a voltage through resistor 259 to connection 145 proportional to $A_1$.

Current flows from wiper 119 through resistor 263 and resistor 262 adding a voltage to connection 145 proportional to $A_3$.

The connections 144, 145 lead to the ends of the primary winding of transformer 308, Fig. 12, which is grounded at an intermediate tap. The resistors 309, 310 in series, and the winding of potentiometer 311 are connected across the secondary winding of transformer 308. The wiper of potentiometer 311 is grounded and adjusted to the current value of the air density. The junction of resistors 309, 310 will then have a potential with respect to ground varying with the desired correction. The resistor 259 aids in matching the impedance of the network to the impedance of transformer 308.

The superelevation must also be corrected for a non-standard air density.

Current from wiper 125 flows through resistor 266 and resistors 267, 269 in series, applying a voltage through resistor 276 to connection 146 proportional to $C_1$.

Current from wiper 119 flows through resistor 268 and resistor 269 adding a voltage on connection 146 proportional to $A_3$.

The resistor 276 assists in matching the impedance of the network to the impedance of the remainder of the circuit.

Current from wiper 128 flows through resistor 275 and resistors 274, 272, 270 in series applying a voltage to connection 147 proportional to $B_2$.

Current flows from wiper 136 through resistor 271 and resistors 272, 270 in series, adding a voltage to connection 147 proportional to $B_4$.

Current from wiper 133 flows through resistor 273 and resistor 270 adding a voltage to connection 147 proportional to $C_3$.

The connections 146, 147 lead to the ends of the primary winding of transformer 312, which is grounded at an intermediate tap. The resistors 313, 314 in series, and the winding of potentiometer 315 are connected across the secondary winding of transformer 308. The wiper of potentiometer 315 is grounded and adjusted to the current value of air density. The junction of resistors 313, 314 will have a potential with respect to ground varying with the desired correction. The wipers of potentiometers 311 and 315 are ganged to move simultaneously.

CORRECTION FOR WIND

From meteorologic observations, a weighted average of the velocity and direction of the prevailing horizontal wind is supplied to the computer. The corrections in the data supplied to the guns, and in the quantities involved in the computation of these data may be made in the following manner.

The voltages tabulated under cross wind in Table 1, when properly added, produce a voltage varying as the effect given in the ballistic tables for a horizontal cross wind having a velocity of sixty miles per hour. The amplitude of this voltage is then reduced in the ratio of the actual velocity of the wind in miles per hour to sixty miles per hour.

If the actual velocity of the wind is W miles per hour, the voltage is reduced in the ratio $$\frac{W}{60}$$

The range wind effect is functionally similar to the cross wind effect and is approximately proportional to the cross wind effect. This portion of the range wind effect which may be taken as 1.170 times the cross wind effect is added to the horizontal distance $D_3 \cos E_3$ and may be designated $$K \cdot \frac{W}{60}$$

The residue of the range wind effect is applied as corrections to the time of flight and superelevation. The residual correction to the superelevation in mils is proportional to the horizontal distance effect in yards, while the residual correction to the time of flight in seconds is proportional to the horizontal distance effect in yards and to a function of the angular height.

For a head wind, the phases of the voltages representing the horizontal range correction, the time of flight correction and the superelevation correction must be such as to increase $D_3$, TF and $E_F$, respectively. These phases are the same and may be obtained from a potentiometer wiper selecting voltages proportional to $+\cos A_{W3}$.

The voltages representing $$\frac{W}{60} \text{ and } K \cdot \frac{W}{60}$$

have amplitudes proportional to the cross and range effects produced by winds of the actual velocity blowing crosswise and along the actual line of fire. The amplitudes of these voltages must, therefore, be reduced proportionally to the components of the actual wind velocity crosswise and along the line of fire.

The component of the actual velocity of the wind crosswise of the line of fire is evidently $W \sin A_{W3}$, and the component along the line of fire is $W \cos A_{W3}$.

The effect of a horizontal cross wind having a velocity of sixty miles per hour is a function of the voltages proportional to $A_1$, $A_2$ and $C_2$.

Current flows from wiper 118 through resistors 227, 257 in series; and from wiper 129 through resistor 228; the combined currents flowing through resistor 229 and applying to connection 157 voltages proportional to $A_2$ and $C_2$.

Current flows from wiper 22 through resistors 237, 231 in series and resistor 230, applying to connection 158 a voltage proportional to $A_1$.

The connections 157, 158 lead to the ends of the grounded primary winding of transformer 316, Fig. 12. The windings of potentiometers 317, 318 are respectively connected across the sections of the grounded secondary winding of transformer 316.

The voltages developed in the secondary windings of transformer 316 represent the deflection in yards due to a cross wind of sixty miles per hour, the wipers of potentiometers 317, 318 which are ganged together to move simultaneously, are adjusted to select equal voltages of opposite phases proportional to the velocity W of the wind. The voltages proportional to $$\frac{W}{60}$$

selected by the wipers of the potentiometers 317, 318 are respectively applied to diametrically opposite points of the winding of potentiometer 322, the equidistant, intermediate, diametrical points being grounded. The winding of potentiometer 322 has a sinusoidal variation in resistance. The wipers of potentiometer 322 are moved by differential gear 49, Fig. 5, through the angle $A_{W3}$ between the bearing of the wind and the azimuth angle of the line of aim.

Wiper 50 of potentiometer 322 selects a voltage proportional to $$\frac{W}{60} \sin A_{W3}$$

the deflection effect of the cross wind. This voltage is supplied to one winding of transformer 323 and, as explained hereinafter, is combined with a voltage proportional to the drift to produce a voltage proportional to the deflection $d$ in Equations 6, 7, 8.

Wiper 109 of potentiometer 322 selects a voltage proportional to $$\frac{W}{60} \cos A_{W3}$$

which is applied across the resistors 325, 326 in series.

The voltage developed across resistor 326 is applied to an input resistor of the summing amplifier 324. As the residual correction to the superelevation in mils (1600 mils equals 90 degrees) is directly proportional to the horizontal cross wind effect in yards, the resistances of resistors 325, 326 and the amplification of this input voltage by amplifier 324 are designed to produce the proper scale factor of volts per mil for this input.

The total voltage across the resistors 325, 326 is applied across the potentiometer winding 321. Wiper 78 is moved proportionately to $E_3$. The potentiometer winding 321 has a variation of resistance such that the voltage selected by the wiper 78 is unity from −200 mils to +569.1 mils and then decreases linearly with $E_3$ down to about 16½ per cent of the applied voltage at 1600 mils.

The voltage selected by the wiper 78 is applied to an input resistor of the time of flight summing amplifier 319. The amplification of this input voltage by amplifier 319 is designed to produce the proper scale factor in volts per second.

As the voltages proportional to the range wind effects are later supplied to summing amplifiers, which reverse the phase or sign of these voltages, the wiper 290 of potentiometer 322 is located 180 degrees behind wiper 109 and 90 degrees behind wiper 50 to select a voltage proportional to $$-\frac{W}{60} \cos A_{W3}$$

The voltage selected by wiper 290 is applied by connection 397 to an input resistor of the summing amplifier 396, Fig. 13. A voltage proportional to $D_3 \cos E_3$ is also supplied to an input resistor of amplifier 396. The amplification of the voltage supplied by the connection 397 is designed to produce a scale factor in volts per yard such that the voltage as added is proportional to $$K \cdot \frac{W}{60} \cos A_{W3}$$

the range effect of the wind, which is the quantity $h$ in Equation 1.

The voltage selected by the wiper 290 of potentiometer 322 is also applied to resistors 327, 328 in series, and the voltage developed across resistor 327 is applied by connection 403 to an input resistor of the summing amplifier 395. The resistances of the resistors 327, 328 and the amplification of this input by the amplifier 395 are designed to produce the proper scale factor in volts per yard for this input, which is the quantity $−h$ in Equation 5.

DEFLECTION

Owing to the twist in the rifling of the gun, the shell has a spin which causes the shell to drift from the firing direction. Current from the wiper 128, Fig. 11, flows through resistors 226 and 225, producing a voltage on the connection 156, proportional to $B_2$. The connection 156 leads to the lower end of the primary winding of transformer 323, Fig. 12.

The deflection component of the wind, or cross wind, has an effect like the drift, thus the voltage selected by wiper 50 of potentiometer 322 is supplied to the upper end of the primary winding of transformer 323. The two voltages applied to the primary winding of transformer 323 combine in the right phase and produce a voltage across the secondary winding proportional to $$\left(\frac{W}{60} \sin A_{W3} + D\right)$$

which is the quantity $d$ in Equations 5 and 6.

TIME OF FLIGHT OF SHELL

For standard conditions, the time of flight TF of the shell may be represented by the sum of voltages proportional to $A_1$, $A_2$, $B_1$, $B_3$, $C_2$, $C_4$.

Current flows from wiper 118 through resistors 206, 207, 208 in series, applying a voltage to connection 148 proportional to $A_2$.

Current flows from wiper 22 through resistors 201, 202, 203 in series, applying a voltage to connection 149 proportional to $A_1$.

Current flows from wiper 137 through resistor 216 and resistors 283, 218, 219 in series, applying a voltage to connection 150 proportional to $C_4$.

Current flows from wiper 129 through resistor 215, and from wiper 132 through resistor 220, the combined currents flowing through resistors 218, 219 in series, adding voltages to connection 150, proportional to $C_2$ and $B_3$.

Current flows from wiper 124 through resistors 217, 219 in series in parallel relationship with resistor 245 adding a voltage to connection 150 proportional to $B_1$.

The connections 148, 149, 150, lead, respectively, to individual inputs of a summing amplifier 319, Fig. 12, which may be of the type shown in Fig. 15. The sum of these voltages will be proportional to the time of flight of the shell for standard conditions. This voltage must be further corrected for non-standard conditions; thus connections 320, from the wiper 78 of potentiometer 321; 151 from the junction of resistors 309, 310; 152 from the junction of resistors 301, 302, also lead to individual inputs of the summing amplifier 319, supplying the required corrections for range wind, air density and muzzle velocity. The output circuit of amplifier 319 supplies equal voltages of opposite phase proportional to the time of flight of the shell.

SUPERELEVATION

The quadrant elevation, or angle of elevation at firing, of the gun is greater than the geometric angular height $E_3$ by the angle of superelevation $E_{F3}$.

In Fig. 11, current flows from wiper 128 through resistor 221 and resistors 223, 224 in series, applying to connection 155 a voltage proportional to $B_2$.

Current flows from wiper 136, through resistor 222 and resistor 224 adding to connection 155 a voltage proportional to $B_4$.

Connection 155 leads to one input resistor of a summing amplifier 324, Fig. 12, which may be of the type shown in Fig. 16.

Non-standard conditions of muzzle velocity and air density are compensated by supplying voltages from the junction of resistors 305, 306 through connection 330, and from the junction of resistors 313, 314 through connection 331, respectively, to individual input resistors of the summing amplifier 324.

Current from oscillator 110, Fig. 11, flows by connection 160 through the winding of potentiometer 332, Fig. 12. The voltage selected by the wiper 81 of potentiometer 332 is supplied by connection 333 to an individual input resistor of the summing amplifier 324.

Current flows from connection 160 through a 90-degree phase shifting network 334, of known type, to one phase winding of a two-phase motor 79, which is also shown on Fig. 6.

The summing amplifier 324 sums up, or adds, the various voltages supplied to the input circuit. If the sum of these voltages is not equal to zero, current is supplied by the amplifier 324 to the other phase winding of motor 79, starting motor 79, which drives the wiper 81 of potentiometer 332, changing the voltage supplied by wiper 81 to amplifier 324 until the sum of the input voltages is reduced to zero, and the wiper 81 has been moved through the angle $E_{F3}$.

FUZE NUMBER

The fuze mechanism, for timing the burst of the shell after the gun has fired, is essentially a small, rugged, centrifugally operated clock. The clock mechanism is not a very accurate timepiece; thus, it is necessary to create voltages which will vary with the actual rate of this small clock. As the clock is driven by the spin of the shell, these voltages must be corrected for a small change in the rate due to non-standard muzzle velocity and density of the air.

Current flows from wiper 22, Fig. 11, through resistors 201, 204 in series, and resistor 205, applying a voltage proportional to $A_1$, through connection 154 to an input resistor of a summing amplifier 335, Fig. 12, which may be of the type shown in Fig. 16.

Current from wiper 118, Fig. 11, flows through resistors 206, 214 in series and resistors 213, 212, 209 in series, applying through resistor 285 a voltage proportional to $A_2$ to the connection 153.

Current from wiper 129 flows through resistor 211 and resistors 212, 209, adding a voltage proportional to $C_2$ to connection 153.

Current from wiper 128 flows through resistor 210 and resistor 209, adding a voltage proportional to $B_2$ to connection 153.

Current from the junction of resistors 301, 302, Fig. 12, flows by connection 152 through resistor 278 and resistors 280, 282 adding through resistor 286 to connection 153 a voltage which corrects for the change in rate with non-standard muzzle velocity.

Current from the junction of resistors 309, 310, Fig. 12, flows by connection 151 through resistor 281 and resistor 282 adding through resistor 286 to connection 153 a voltage which corrects for the change in rate with non-standard air density.

The resistors 285, 286 reduce interaction between the various voltages.

Connection 153 leads to an input resistor of the summing amplifier 335, Fig. 12.

Voltage proportional to TF is supplied by connection 336 to an input resistor of the summing amplifier 335, Fig. 12.

After the firing data are received at the gun, the fuze must be set, the shell loaded in the chamber and the breech closed before the gun may be fired. The time taken for these actions, that is, the time from the final setting of the fuze to the actual firing of the gun, is known as the dead time. This time period cannot be accurately determined but may be estimated for any gun crew and will usually be less than four seconds. The fuze setting, as given by the time of flight determined by the geometry of the target, must be corrected for the dead time.

Figure 3:
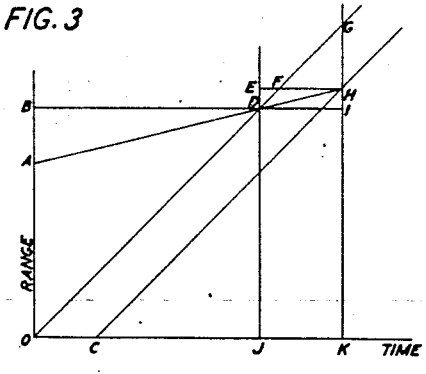

For convenience the target may first be considered as flying in the line of sight from the present position. In Fig. 3 the ordinates are the values of the slant range and the abscissae are time measured from the present time, O.

OA is the present slant range $D_2$.

OB is the geometrical future slant range $D_3$.

If the shell were fired at time zero, the time range plot of the shell moving at uniform velocity would be OD, intersecting the course, ADH, of the target at D, having range $D_3$ and elapsed time $OJ = TF$.

But the shell is not fired until after the dead time $OC = t_d$ has elapsed. The time range plot of the shell moving at uniform velocity is CH, intersecting the course at H.

Thus, the fuze setting is related to the time interval CK, which may be designated $TF_1$.

Thus $$OJ = TF$$
$$OC = t_d = FH$$
$$CK = TF_1$$
$$JK = TF_1 + t_d - TF$$
$$EF = TF_1 - TF$$

From simple geometry $$\frac{EF}{FH} = \frac{DF}{FG} = \frac{IH}{HG} = \frac{AB}{OA}$$

$$OA = D_2 \quad OB = D_3 \quad AB = D_3 - D_2$$

Thus $$\frac{TF_1-TF}{t_d}=\frac{D_3-D_2}{D_2} \quad (11)$$

The correction $TF_1-TF$ of the time of flight is to the dead time $t_d$ as the change in slant range $D_3-D_2$ during the time of flight TF is to the present slant range $D_2$. This relationship was deduced on the assumption of constant velocity of the shell during its flight. This assumption is not rigorously true, but correct results may be obtained by using empirical functions of $D_3$ and of $D_2$.

If the velocity of the target is not entirely in the line of sight, the conditions are as shown in Fig. 2. The change in slant range during the time TF is evidently $P_2v$.

Thus $$\frac{TF_1-TF}{t_d}=\frac{P_2v}{D_2}$$

But, from column 6, $$P_2v = -D_3 \cos E_{32} + D_3 \cos E_3 \cos E_2 . 2 \sin^2 \frac{A_{32}}{2} +$$
$$D_2 + (d \sin A_{32} \cos E_2 - h \cos A_{32} +$$
$$X_p \cos A_2 \cos E_2 + Y_p \sin A_2 \cos E_2 + Z_p \sin E_2)$$

During the small time interval $t_d$, the bracketed quantities are substantially constant and small, and may be ignored.

Thus $$\frac{TF_1-TF}{t_d} = \frac{-\left(D_3 \cos E_{32} - D_2 - D_3 \cos E_3 \cos E_2 . 2 \sin^2 \frac{A_{32}}{2}\right)}{D_2}$$

$$= \frac{-\left(D_3 - D_2 - D_3 . 2 \sin^2 \frac{E_{32}}{2} - D_3 \cos E_3 \cos E_2 . 2 \sin^2 \frac{A_{32}}{2}\right)}{D_2}$$

$$= -\frac{D_{32}}{D_2} + \frac{D_3 \left(2 \sin^2 \frac{E_{32}}{2} + 2 \sin^2 \frac{A_{32}}{2} \cos E_2 \cos E_3\right)}{D_2}$$

$$= f_1(D_2) f_2(D_{32}) + k \left(2 \sin^2 \frac{E_{32}}{2} + 2 \sin^2 \frac{A_{32}}{2} \cos E_2 \cos E_3\right)$$

The negative signs merely indicate that, as shown in Fig. 2, $D_3$ is less than $D_2$. As the shell velocity is not constant, as before, $$\frac{-D_{32}}{D_2}$$

is replaced by $f_1(D_2)f_2(D_{32})$. The constant $k$ is empirically selected to give the best match with the ballistic tables. For the particular gun having the ballistic properties given in Figs. 9 and 10, this equation was used in the following form:

$$TF_1-TF = t_d\left(\left(\frac{1}{D_2}+.0674\right)f_2(D_{32}) + 1.82\left(2\sin^2\frac{E_{32}}{2}+2\sin^2\frac{A_{32}}{2}\cos^2 E_2\right)\right) \quad (12)$$

The connections 159, 160 lead respectively from the 0 and $\pi$ phases of transformer 111, Fig. 11.

The current from connection 160 flows through the winding of potentiometer 337, Fig. 12. The wiper 44 of potentiometer 337 is moved by motor 43, Fig. 5, proportionally to $A_{32}$. The winding of potentiometer 337 is shaped so that the voltage selected by the wiper 44 will be proportional to $$2 \sin^2 \frac{A_{32}}{2}$$

The voltage selected by the wiper of potentiometer 337 is applied to the winding of potentiometer 338. The wiper 68 of potentiometer 338 is moved by the shaft 66, Fig. 6, proportionally to $E_2$. The voltage selected by the wiper 68 of potentiometer 338 is proportional to $$2 \sin^2 \frac{A_{32}}{2} \cos^2 E_2$$

and this voltage is applied through resistor 339 across the winding of potentiometer 340. The current produced in the winding of potentiometer 340 will be proportional to the last term of Equation 12.

Current from connection 160 is supplied to an intermediate tap of the winding of potentiometer 341. The wiper 75 of potentiometer 341 is moved by motor 73, Fig. 6, through the angle $E_{32}$. The voltage selected by the wiper 75 of potentiometer 341, proportional to $$2 \sin^2 \frac{E_{32}}{2}$$

the penultimate term of Equation 12, is applied through resistor 342 across the winding of potentiometer 340.

The winding of potentiometer 343 is connected across the connections 159, 160, an intermediate point being grounded. The resistance of the winding of potentiometer 343 varies as a function of $D_{32}$. The voltage selected by the wiper of potentiometer 343 is proportional to $f_2(D_{32})$.

Current from the wiper of potentiometer 343 flows through variable resistor 344, resistor 345 and the winding of potentiometer 340. The winding of resistor 344 has a resistance varying with $D_2$, the slant distance to the present position of the target, and the wiper is moved by shaft 13, Fig. 4. The windings of potentiometer 343, and resistor 344 are designed so that the current in winding 340 is proportional to $$\left(\frac{1}{D_2}+.0674\right)f_2(D_{32})$$

The resistances of the windings 337, 338, 341, 343, 344 and the resistances of resistors 339, 342, 345 are so selected as to produce scale factors for the currents in the winding 340 having the numerical relationships shown in Equation 12.

The wiper of potentiometer 340 is adjusted to the dead time $t_d$, to select a voltage proportional to $$t_d\left(\left(\frac{1}{D_2}+.0674\right)f_2(D_{32})+ 1.82\left(2\sin^2\frac{E_{32}}{2}+2\sin^2\frac{A_{32}}{2}\cos^2 E_2\right)\right)$$

which is supplied to an input resistor of the summing amplifier 335, and corrects the fuze number for the change in the time of flight of the shell due to the dead time.

As the fuze is, in effect, a small clock, the fuze numbers indicate intervals of time. But the shaft 23, Fig. 4, is moved proportionally to $D_3$ a distance. Thus, the rotation of the servo-motor 25, proportional to the correction $D_{F3}$, must also be in the same units, and it is therefore necessary to establish a correlation between the fuze numbers and slant distance.

For the particular gun considered, the distance traveled per fuze second is assumed to be 500 yards, and if Z be the fuze number, the total distance will be 500Z. But the total distance represented by the rotation of shaft 23, Fig. 4, is $D_3$. Thus, the required correction $D_{F3}$, due to motor 25, is $D_3-500Z$ in yards. Considering the fuze number Z as fuze seconds, $$Z = \frac{D_3}{500} + \frac{D_{F3}}{500}$$

and this time must equal the time of flight TF, plus the correction for dead time, $TF_1-TF$, from Equation 12, plus the fuze calibration correction FC from Table 1. In Table 2, $$h_1(D_3) = \frac{D_3}{12,500}$$

thus $$\frac{D_3}{500} = 25h_1(D_3)$$

or $A_1=25$. The fuze calibration correction FC in Table 1, should have included a component $-.378A_1$ which was omitted, thus the value of $$\frac{D_3}{500}$$

is reduced to $(25-.378)h_1(D_3)$ or $24.622h_1(D_3)$ to correct the omission.

Thus, the balace equation for the $D_{F3}$ correction will be $$24.622h_1(D_3) + \frac{D_{F3}}{500} - TF - (TF_1 - TF) + FC = 0 \quad (13)$$

Currents from connections 159, 160, respectively, flow in the sections of potentiometer winding 346, to ground. Wiper 27 can select a voltage of either phase depending upon its position.

Thus, to the various inputs of summing amplifier 335, connection 154 supplies a voltage proportional to $24.622h_1(D_3)$; wiper 27 supplies a voltage proportional to $$\frac{D_{F3}}{500}$$

connection 336 supplies a voltage proportional to TF; the wiper of potentiometer 340 supplies a voltage proportional to $(TF_1-TF)$ and connection 153 supplies a voltage proportional to FC.

Current from connection 160 is supplied through the 90-degree phase shift network 334 to one phase winding of the motor 25, which is also shown in Fig. 4. The other phase winding of motor 25 is connected to the output of the summing amplifier 335.

If the voltages supplied to the input of the summing amplifier 335 are not equal to zero, current will flow from the output circuit starting motor 25 which moves the wiper 27 of potentiometer 346 until the input voltages are equal and motor 25 stops. The wiper 27 of potentiometer 346 has thus been moved proportionally to $D_{F3}$, the difference between the virtual fuze range and the future slant range.

INCREMENT IN DISTANCE $D_{32}$

The increment in distance $D_{32}$ is computed in accordance with Equation 8.

The two sections of potentiometer winding 347, Fig. 12, are respectively connected to the 0 phase connection 159 and the $\pi$ phase connection 160 from the transformer 111, Fig. 11. The wiper 20 is moved by shaft 19, Fig. 4. The voltage selected by wiper 20 proportional to $D_{32}$, is supplied by connection 348 to an input resistor of the summing amplifier 351, Fig. 13, which may be of the type shown in Fig. 16.

The voltage selected by wiper 22, Fig. 11, proportional to $D_3$ is applied by transformer 121 to both sections of the potentiometer winding 163. The wiper 164, like the wiper 75, Fig. 6, is moved proportionately to $E_{32}$. The voltage selected by the wiper 164, proportional to $$D_3 . 2 \sin^2 \frac{E_{32}}{2}$$

is applied by connection 165 to an input resistor of the summing amplifier 351, Fig. 13.

The potentiometer windings 352, 353, 354, Fig. 13, have both ends connected to the 0 phase connection 159, the center connected to the $\pi$ phase connection 160 from transformer 111, Fig. 11, intermediate points in the windings being grounded. The wipers 355, 356 are adjusted to select equal voltages, respectively, of opposite phase, proportional to $X_p$, the $x$ component of the parallax from the point of observation to the gun. The voltages selected by the wipers 361, 362 are respectively supplied through resistors 357, 358 to diametrically opposite points of the windings of potentiometers 359, 360, the equidistant, intermediate points of these windings being grounded.

The wipers 361, 362 are adjusted to select equal voltages, respectively of opposite phase, proportional to $Y_p$, the y component of the parallax. The voltages selected by the wipers 361, 362 are respectively supplied through resistors 363, 364 to diametrically opposite points of the windings of potentiometers 365, 366, the equidistant, intermediate points of these windings being grounded.

The wipers 367, 368 are adjusted to select equal voltages, respectively of opposite phase, proportional to $Z_p$, the z component of the parallax. The voltages selected by the wipers 367, 368 are respectively supplied through resistors 369, 370 to diametrically opposite points of the windings of potentiometers 371, 372, the equidistant, intermediate points of these windings being grounded.

The windings of potentiometers 359, 360, 365, 366, 371, 372 have a sinusoidal variation of resistance. For convenience of description, the windings of potentiometers 359, 365, 371 have been shown separate from the windings of potentiometers 360, 366, 372, but, if desired, only the windings 359, 365, 371 may be used, with two wipers bearing on each winding.

The wipers of potentiometers 359, 360, 365, 366 are moved by the shaft 37, Fig. 5, proportionately to $A_2$, the azimuthal angle to the present position of the target.

The wipers of potentiometers 371, 372 are moved by the shaft 66, Fig. 6, proportionately to $E_2$, the angular height to the present position of the target.

The voltage selected by the wiper 67 of potentiometer 371, proportional to $Z_p \sin E_2$ is applied to an input resistor of the summing amplifier 351.

The output voltages of the summing amplifier 319, Fig. 12, proportional to TF, the time of flight of the shell and respectively of opposite phase, are supplied through variable resistors 373, 374 to the sections of the winding of potentiometer 375. The wipers of the resistors 373, 374 are moved by motor 640, Fig. 17, proportionately to the elapsed time $t$ from the "memory point" or predetermined past time to the present time. The voltages supplied to the sections of the winding of potentiometer 375 are thus proportional to $$\frac{TF}{t}$$

A voltage proportional to $$\frac{TF}{t}$$

is also supplied through resistor 373 to the potentiometer winding 376.

The wiper 16 is moved by shaft 12, Fig. 4, proportionally to $D_{21}$, the increment in slant distance from the "memory point" to the present position of the target. The wiper 14 is moved by the shaft 13, Fig. 4, proportionally to $D_2$, the slant distance to the present position of the target.

The voltages selected by the wipers 14 and 16, equal to $$\frac{TF}{t} \cdot D_2 \text{ and } \frac{TF}{t} \cdot D_{21}$$

are respectively supplied through connections 377, 378 to individual input resistors of the summing amplifier 379, Fig. 13. The voltage selected by the wiper 14 is of 0 phase, and the rotation of wiper 16 is such that wiper 16 selects a voltage of $\pi$ phase when $D_2$ is larger than $D_1$. The applied voltages are added by the summing amplifier, to give $D_2-D_{21}$ which equals $D_2-(D_2-D_1)$ or $D_1$. The output voltage of amplifier 379 is thus proportional to $$\frac{TF}{t} D_1$$

The voltage selected by the wiper 16 is also supplied to an input resistor of the amplifier 380. The amplifiers 379 and 380 may be of the type shown in Fig. 15.

The 0 phase output of amplifier 380 is connected through resistor 381 to connection 287; the 0 phase output of amplifier 379 is connected through resistor 382 to connection 287; the $\pi$ phase output of amplifier 380 is connected through resistor 383 to connection 388; and the $\pi$ phase output of amplifier 379 is connected through resistor 384 to connection 388. The resistors 381, 382, 383, 384 form a passive network which adds the voltages from the outputs of amplifiers 379 and 380 to produce voltages of 0 phase and $\pi$ phase respectively, at the connections 287, 388, equal to $D_1+D_{21}$ which equals $$D_1+D_2-D_1 \text{ or } D_2$$

thus the voltages of the connections 287, 388 are proportional to $$\frac{TF}{t} D_2$$

The resistors 385, 386 form a load of fixed impedance for amplifiers 379, 380 and reduce the effect of impedance changes in the remainder of the circuit.

The voltages of the connections 389, 390, respectively, of 0 phase and $\pi$ phase, are proportional to $$\frac{TF}{t} D_1$$

When operating with a "memory point," the switch 391, Fig. 13, is operated to the right. The connection 387 then extends through Fig. 14 and the make springs 7 of switch 391, applying a voltage proportional to $$\frac{TF}{t} \cdot D_{21}$$

to an input resistor of the summing amplifier 351, Fig. 13.

The winding of potentiometer 392, Fig. 14, is connected between connection 389 and ground. The wiper of potentiometer 392 is moved by the shaft 66, Fig. 6, proportionally to $E_{21}$. The voltage selected by the wiper of potentiometer 392, proportional to $$\frac{TF}{t} D_1 . 2 \sin^2 \frac{E_{21}}{2}$$

is supplied by connection 393, through make springs 9 of switch 391, Fig. 13, to an input resistor of summing amplifier 351.

The wiper of potentiometer 359, Fig. 13, is moved by shaft 37, Fig. 5, through the angle $A_2$ the azimuthal angle to the present position of the target, to select a voltage proportional to $X_p \cos A_2$ which is supplied to an input resistor of the summing amplifier 395, which may be of the type shown in Fig. 15.

The wiper of potentiometer 366 is also moved by the shaft 37 to select a voltage proportional to $Y_p \sin A_2$ which is applied to an individual input resistor of the summing amplifier 395.

The voltage selected by the wiper 125, Fig. 11, proportional to $D_3 \cos E_3$ is applied by connection 167 to an input resistor of the summing amplifier 396, Fig. 13, which may be of the type shown in Fig. 15.

The voltage selected by the wiper 290 of potentiometer 322, Fig. 12, is applied by connection 397 to an individual input resistor of the summing amplifier 396, Fig. 13. The output of the summing amplifier 396 is thus proportional to $S_3$, Equation 1.

The output of summing amplifier 396 is connected to both sections of the winding of potentiometer 398. The wiper of potentiometer 398 is moved by motor 43, Fig. 5, proportionally to the angle $A_{32}$ to select a voltage proportional to $$S_3 . 2 \sin^2 \frac{A_{32}}{2}$$

or $$(D_3 \cos E_3 + h) . 2 \sin^2 \frac{A_{32}}{2}$$

which is applied to an individual input resistor of the summing amplifier 395, Fig. 13.

The output voltage of amplifier 379, Fig. 13, proportional to $$\frac{TF}{t} D_1$$

is supplied to the ends of the winding of potentiometer 399, Fig. 14, an intermediate point being grounded. The wiper 72 of potentiometer 399 is moved by the clutch 70, Fig. 6, through the angle $E_1$. The voltage selected by the wiper 72 of potentiometer 399, proportional to $$\frac{TF}{t} D_1 \cos E_1$$

is applied to an amplifier 400, which may be of the type shown in Fig. 15. The output of amplifier 400 is applied to diametrically opposite points of the winding of potentiometer 401, the equidistant, intermediate points of the winding being grounded. The wiper of potentiometer 401 is moved by the clutch 40, Fig. 5, to select a voltage proportional to $$\frac{TF}{t} D_1 \cos E_1 . 2 \sin^2 \frac{A_{21}}{2}$$

which is applied by connection 402, through make springs 11 of switch 391, Fig. 13, to an individual input resistor of the summing amplifier 395.

The potential developed across resistor 327, Fig. 12, proportional to $h$, is applied by connection 403 to an input resistor of the summing amplifier 395, Fig. 13.

The output of transformer 323, Fig. 12, proportional to the deflection, $d$, is applied to the ends of the winding of potentiometer 404, an intermediate point being grounded. The wiper 45 of potentiometer 404 is moved by the motor 43, Fig. 5, proportionally to $A_{32}$ to select a voltage proportional to $d \sin A_{32}$ which is applied by connection 405 to an input resistor of the summing amplifier 395, Fig. 13. The output of the summing amplifier 395 is thus proportional to $S_2$, Equation 5.

The output of 0 phase of the summing amplifier 395 is applied to the two sections of the winding of potentiometer 406. The wiper of potentiometer 406 is moved by shaft 66, Fig. 6, through the angle $E_2$ to select a voltage proportional to $S_2 \cos E_3$ which is applied by connection 407 to an input resistor of the summing amplifier 351. The output of the summing amplifier is thus proportional to Equation 8.

Current of 0 phase from transformer 111, Fig. 12, is supplied by connection 159 through a 90-degree phase shift network 408, Fig. 13, of known type to one-phase winding of the two-phase motor 18. The output of amplifier 351 is supplied to the other phase winding of motor 18. If the output of amplifier 351 is not equal to zero, motor 18 will start, driving the wiper 20, of potentiometer 347, Fig. 12, to select a voltage exactly proportional to $D_{32}$, which will make the output of amplifier 351 equal to zero, when motor 18 stops. The wiper 20 has thus been moved to a position proportional to $D_{32}$.

INCREMENT IN ANGULAR HEIGHT $E_{32}$

The increment in angular height is computed by Equation 7.

The secondary winding of transformer 121, Fig. 12, is connected to opposite ends of the potentiometer winding 161, an intermediate point of the winding being grounded. The wiper 162 is moved by motor 73, Figs. 6 and 13, through the angle $E_{32}$. The voltage selected by the wiper 162, proportional to $D_3 \sin E_{32}$ is applied by connection 166 to an input resistor of the summing amplifier 410, Fig. 13, which may be of the type shown in Fig. 16.

The wiper of potentiometer 372, Fig. 13, is moved by the shaft 66, Fig. 6, through the angle $E_2$ to select a voltage proportional to $-Z_p \cos E_2$ which is applied to an input resistor of the summing amplifier 410.

The output voltage of amplifier 379, Fig. 13, proportional to $$\frac{TF}{t} D_1$$

is applied to the ends of the winding of potentiometer 412, Fig. 14, an intermediate point being grounded. The wiper of potentiometer 412 is moved by clutch 69, Fig. 6, through the angle $E_{21}$ to select a voltage proportional to $$-\frac{TF}{t}(D_1 \sin E_{21})$$

which is applied by connection 411 through make springs 8 of switch 391, Fig. 13, to an input resistor of amplifier 410.

The output voltage of summing amplifier 395, Fig. 13, is applied across the winding of potentiometer 413, an intermediate point of the winding being grounded. The wiper of potentiometer 413 is moved by the shaft 66, Fig. 6, through the angle $E_2$ to select the voltage proportional to $+S_2 \sin E_2$ which is applied to an input resistor of amplifier 410.

Current from the phase shifting network 408, Fig. 13, is supplied to one-phase winding of the two-phase motor 73. The output of summing amplifier 410 is supplied to the other phase winding. If the output of the summing amplifier 410 is not equal to zero, motor 73 will start and move the wiper 162, Fig. 11, and the shaft 74, Fig. 6 until the output voltage of amplifier 410, Fig. 13, is reduced to zero. The wiper 162 and shaft 74 have thus been moved through the increment $E_{32}$ in the elevation angle.

INCREMENT IN AZIMUTHAL ANGLE $A_{32}$

The increment in azimuthal angle is computed by Equation 6. The output voltage of summing amplifier 396, Fig. 13, proportional to $S_3$ is applied across the winding of potentiometer 415, an intermediate point being grounded. The wiper of potentiometer 415 is moved by motor 43, Figs. 5 and 13, to select a voltage proportional to $S_3 \sin A_{32}$ which is applied by connection 416 to an input resistor of the summing amplifier 417, which may be of the type shown in Fig. 16.

The output voltage of transformer 323, Fig. 12, proportional to $d$ is applied to the two sections of the winding of potentiometer 418, which are also grounded. The wiper of potentiometer 418 is moved by motor 43, Figs. 5 and 13, to select a voltage approximately proportional to $d \cos A_{32}$ which is applied by connection 419 to an input resistor of summing amplifier 417, Fig. 13.

The voltage selected by the wiper of potentiometer 360, Fig. 13, proportional to $X_p \sin A_2$ is applied to an input resistor of the summing amplifier 417.

The voltage selected by the wiper of potentiometer 365, Fig. 13, proportional to $-Y_p \cos A_2$ is applied to an input resistor of the summing amplifier 417.

The output voltage of amplifier 400, Fig. 14, proportional to $$\frac{TF}{t} D_1 \cos E_1$$

is applied across the winding of potentiometer 420, Fig. 14, an intermediate point of the winding being grounded. The wiper of potentiometer 420 is moved by the clutch 40, Fig. 5, through angle $A_{21}$ to select a voltage proportional to $$-\frac{TF}{t}(D_1 \cos E_1 \sin A_{21})$$

which is applied by connection 421 through make springs 10 of switch 391, Fig. 13, to an input resistor of the summing amplifier 417. The output of summing amplifier will be proportional to Equation 6.

Current from the phase shifting network 408, Fig. 13, is supplied to one-phase winding of the two-phase motor 43. The output of the summing amplifier 417 is supplied to the other phase winding of motor 43. If the output of amplifier 417 is not equal to zero, motor 43 starts moving the wipers of potentiometers 415, Fig. 13, and 418, Fig. 12, until the output voltage of the amplifier is reduced to zero, and the positions of the wipers of potentiometers 415 and 418 have been changed to the angle $A_{32}$.

TARGET MOTION

In the present director, the prediction is based upon the assumption that the target moves in a straight line with constant, unaccelerated velocity from the "memory point" to the predicted position. If the target changes its course or velocity between the "memory point" and the present position, this assumption is erroneous and a shell fired in accordance with the erroneous prediction will probably miss the target. Meters are therefore provided which indicate when the target ceases to fly in a straight line or at a constant velocity.

If the target is flying in a straight line at constant, unaccelerated velocity, the rates of change, $\dot{x}, \dot{y}, \dot{z}$ in the $x, y$ and $z$ coordinates are constant.

The increments, $x_{32}, y_{32}, z_{32}$ in the $x, y, z$ coordinates during TF, the time of flight of the shell, are evidently $\dot{x}.TF, \dot{y}.TF, \dot{z}.TF$ $$\dot{x}TF = x_{32}$$
$$\dot{y}TF = y_{32}$$
$$\dot{z}TF = z_{32}$$

The increments $x_{32}, y_{32}, z_{32}$, from the present to the predicted positions, are evidently to the increments $x_{21}, y_{21}, z_{21}$, from the past to the present positions, as TF, the time of flight is to $t$ the elapsed time.

$$x_{32} = \frac{TF}{t} x_{21}$$
$$y_{32} = \frac{TF}{t} y_{21}$$
$$z_{32} = \frac{TF}{t} z_{21}$$

From Fig. 1, $$x_2 = D_2 \cos E_2 \cos A_2,$$

and $$x_1 = D_1 \cos E_1 \cos A_1$$

$$x_{21} = x_2 - x_1$$
$$= D_2 \cos E_2 \cos A_1 - D_1 \cos E_1 \cos A_1$$
$$= D_2 \cos E_2 \cos A_2 - E_1 \cos E_1 \cos (A_1 - A_{21})$$
$$= \cos A_2 \left( D_2 \cos E_2 + D_1 \cos E_1 . 2 \sin^2 \frac{A_{21}}{2} - D_1 \cos E_1 \right) - D_1 \cos E_1 \sin A_{21} \sin A_2$$

$$\dot{x}TF = x_{32} = \frac{TF}{t} x_{21}$$

$$\dot{x}TF - \cos A_2 \left( \frac{TF}{t} D_2 \cos E_2 + \frac{TF}{t} D_1 \cos E_1 . 2 \sin^2 \frac{A_{21}}{2} - \frac{TF}{t} D_1 \cos E_1 \right) + \frac{TF}{t} D_1 \cos E_1 \sin A_{21} \sin A_2 = 0 \quad (14)$$

From Fig. 1,
$$y_2 = D_2 \cos E_2 \sin A_2$$
and
$$y_1 = D_1 \cos E_1 \sin A_1$$

$$\begin{aligned} y_{21} &= y_2 - y_1 \\ &= D_2 \cos E_2 \sin A_2 - D_1 \cos E_1 \sin A_1 \\ &= D_2 \cos E_2 \sin A_2 - D_1 \cos E_1 \sin(A_2 - A_{21}) \\ &= \sin A_2 \left( D_2 \cos E_2 + D_1 \cos E_1 . 2 \sin^2 \frac{A_{21}}{2} - D_1 \cos E_1 \right) + D_1 \cos E_1 \sin A_{21} \cos A_2 \end{aligned}$$

$$\dot{y}TF = y_{32} = \frac{TF}{t} y_{21}$$

$$\dot{y}TF - \sin A_2 \left( \frac{TF}{t} D_2 \cos E_2 + \frac{TF}{t} D_1 \cos E_1 . 2 \sin^2 \frac{A_{21}}{2} - \frac{TF}{t} D_1 \cos E_1 \right) - \frac{TF}{t} D_1 \cos E_1 \sin A_{21} \cos A_2 = 0 \quad (15)$$

From Fig 2,
$$z_2 = D_2 \sin E_2, \quad z_1 = D_1 \sin E_1$$
$$z_{21} = D_2 \sin E_2 - D_1 \sin E_1$$
$$\dot{z}TF = z_{32} = \frac{TF}{t} z_{21}$$
$$\dot{z}TF = \frac{TF}{t} D_2 \sin E_2 + \frac{TF}{t} D_1 \sin E_1 = 0 \quad (16)$$

The output voltages of amplifier 319, Fig. 12, proportional to TF, are supplied, by connections 425, 426, to the windings of potentiometers 427, 428, 429, 430, 431, and 432, Fig. 13, the center taps of these potentiometers being grounded. The wipers of potentiometers 427, 428; of potentiometers 429, 430 and of potentiometers 431, 432, respectively, are arranged to be moved simultaneously outward or inward to select equal voltages with respect to ground. The wipers of potentiometers 427, 428 are arbitrarily set to select voltages proportional to $\dot{x}TF$; and, similarly, the wipers of potentiometers 429, 430 are set to select voltages proportional to $\dot{y}TF$ and the wipers of potentiometers 431, 432 are set to select voltages proportional to $\dot{z}TF$.

The switch 391, Fig. 14, is operated to the right for "memory point" computations. The voltage selected by the wiper of potentiometer 428, of proper phase proportional to $\dot{x}TF$ is applied by connection 445 through right-hand make contacts 2 of switch 391 to grounded resistor 434. The voltage developed across resistor 434 is applied by connection 445 to an input resistor of the summing amplifier 446, Fig. 15, which may be of the type shown in Fig. 16.

The connection 388 applies a voltage proportional to
$$\frac{TF}{t} D_2$$
to an intermediate point in the winding of potentiometer 447, Fig. 14, the ends of the winding being grounded. The wiper of potentiomter 447 is moved by shaft 66, Fig. 6, proportionately to $E_2$ to select a voltage proportional to
$$\frac{TF}{t} D_2 \cos E_2$$
which is applied by connection 448 to an input resistor of the summing amplifier 449, Fig. 14, which may be of the type shown in Fig. 15.

The voltage selected by the wiper of potentiometer 401, Fig. 14, proportional to
$$\frac{TF}{t} D_1 \cos E_1 . 2 \sin^2 \frac{A_{21}}{2}$$
is applied by connection 402 to an input resistor of the summing amplifier 449.

The output voltage of the amplifier 400, Fig. 14, proportional to
$$\frac{TF}{t} D_1 \cos E_1$$
is applied by connection 450 to an input resistor of the summing amplifier 449.

The summing amplifier 449 sums up or adds the applied voltages to produce output voltages of opposite phase which are applied to diametrically opposite points of the winding of potentiometer 451, the equidistant, intermediate points of the winding being grounded. The wiper 39 is moved by the shaft 37, Fig. 5, proportionately to the angle $A_2$ to select a voltage proportional to $\cos A_2$, which is applied to an input resistor of the summing amplifier 446.

The voltage selected by the wiper 41 of potentiometer 420, Fig. 14, is applied to the grounded primary winding of transformer 452. The voltages induced in the two sections of the secondary winding of transformer 452 are applied to diametrically opposite points of the winding of potentiometer 453, the equidistant, intermediate points of the winding being grounded. The wiper of potentiometer 453, like the wiper 39, is moved proportionally to the angle $A_2$ to select a voltage varying with $\sin A_2$. The voltage selected by the wiper of potentiometer 453 is applied to an input resistor of the amplifier 446.

The output of amplifier 446 is supplied to a meter 454.

The target is brought under observation and when the observed results have settled down to reliable data, the wiper of potentiometer 428, Fig. 13, is adjusted until the meter 454 reads zero. If the target continues on a straight line course at constant speed, in accordance with Equation 14, the meter 454 will continue to read zero. If the target changes course or speed in such a way as to change the velocity of the target in the line of the $x$ axis, the meter 454 will no longer read zero, indicating that the assumed conditions underlying the prediction are no longer valid.

The voltage selected by the wiper of potentiometer 430, Fig. 13, proportional to $\dot{y}TF$ is applied through make springs 4 of switch 391 to resistor 436, and the voltage developed across resistor 436 is applied by connection 455 to an input resistor of the summing amplifier 456 which may be of the type shown in Fig. 16.

The output voltages of the summing amplifier 449, Fig. 14, are applied to diametrically opposite points of the winding of potentiometer 457, the intermediate equidistant points of the winding being grounded. The wiper of potentiometer 457 is moved like wiper 39 through the angle $A_2$ to select a voltage proportional to $-\sin A_2$. The voltage selected by the wiper of potentiometer 457 is supplied to an input resistor of the summing amplifier 456.

The outer ends of the secondary winding of transformer 452, Fig. 14, are connected to diametrically opposite points in the winding of potentiometer 458, the equidistant, intermediate points being grounded. The wiper of potentiometer 458, like the wiper 39, is moved proportionally to $A_2$ and selects a voltage varying with $-\cos A_2$. The voltage selected by the wiper of potentiometer 458 is applied to an input resistor of the summing amplifier 456.

The output circuit of amplifier 456 is connected to meter 459.

The wiper of potentiometer 430, Fig. 13, like the wiper of potentiometer 428, is adjusted to make the meter 459, Fig. 14, read zero, in accordance with equation 15. If the velocity of the target along the $y$ axis varies, the meter 459 will no longer read zero.

Similarly, the wiper of potentiometer 432, Fig. 13, is adjusted to select a voltage proportional to $\dot{z}TF$ which is applied by connection 460, through make spring 6 of key 391 to resistor 438, and the voltage developed across resistor 438 is applied by connection 460 to an input resistor of summing amplifier 461, Fig. 14, which may be of the type shown in Fig. 15.

The connections 287, 388 from amplifier 380, Fig. 13, lead to the ends of the winding of potentiometer 462, Fig. 14, which is grounded at an intermediate point. The wiper of potentiometer 462 is moved by the shaft 66, Fig. 6, proportionally to the angle $E_2$ to select a voltage proportional to $\sin E_2$ which is applied by connection 463 to an input resistor of the summing amplifier 461.

The connections 389, 390 from amplifier 379, Fig. 13, lead to the ends of the winding of potentiometer 464, Fig. 14. An intermediate point in the winding is grounded. The wiper of potentiometer 464 is moved by the clutch 70, Fig. 6, proportionately to $E_1$, to select a voltage proportional to $\sin E_1$ which is applied by connection 465 to an input resistor of the summing amplifier 461.

The output circuit of the summing amplifier 461 is connected to the meter 466.

The wiper of potentiometer 432, Fig. 13, is adjusted to make the meter 466, Fig. 14, read zero, in accordance with equation 16. If the velocity of the target along the $z$ axis varies, the meter 466 will no longer read zero.

HANDSET RATES

In order to obtain a good scale factor for the timing potentiometers 373, 374, Figs. 12 and 17, the drive is arranged so that the wiper will traverse the whole winding in a time related to the time of observation of an average target. In many cases, the target will be under fire for longer than this time, and a new "memory point" must be selected. Also, from observation of the meters 454, 459, 466, it may be evident that the target has changed course, since the "memory point" was selected, and a new "memory point," related to the new course must be selected. And, in some cases, the speed and direction of the target may be determined by spotting stations, so that approximate rates may be set into the computer before the target comes within the range of the tracker and range finder.

In Fig. 1, let $P_{1aa}$ be the vector representing the velocity of the target along the $x$ axis, or $\dot{x}$, and $aaP_2$ be the vector representing the velocity along the $y$ axis, or $\dot{y}$. As $P_{1ab}$ is parallel to the $x$ axis, angle $P_{1ab}P_2=A_2$. Thus, $aa \cdot ac$ or $ad \cdot a$ equals $\dot{y} \cos A_2$. As $aa \cdot ad$ is parallel to $TP_2$, angle $P_1 \cdot aa \cdot ad = A_2$, thus $P_{1ad}$ equals $-\dot{x} \sin A_2$ (the sign indicating that the $x$ coordinate is decreasing). The distance $P_{1a}$ equals $D_1 \cos E_1 \sin A_{21}$ and the target covers this distance in $t$ seconds, thus the velocity of the target is $$D_1 \frac{\cos E_1 \sin A_{21}}{t}$$

Hence, $$\dot{y} \cos A_2 - \dot{x} \sin A_2 = D_1 \frac{\cos E_1 \sin A_{21}}{t}$$

and $$\dot{y}TF \cos A_2 - \dot{x}TF \sin A_2 = \frac{TF}{t}(D_1 \cos E_1 \sin A_{21}) \quad (17)$$

Substituting this value in Equation 6, $$S_3 \sin A_{32} + d \cos A_{32} + X_p \sin A_2 - Y_p \cos A_2 - \dot{y}TF \cos A_2 + \dot{x}TF \sin A_2 = 0$$

or $$S_3 \sin A_{32} + d \cos A_{32} + (X_p + \dot{x}TF) \sin A_2 - (Y_p + \dot{y}TF) \cos A_2 = 0 \quad (18)$$

Thus, the balance equations for prediction with "hand set" rates in the case of a moving target are equivalent to the equations for a stationary target, the gun parallax being simply increased by the displacement of the target during the time of flight.

Thus Equations 7 and 8 may be similarly modified for "hand set" rates, into the following balance equations:

$$D_3 \sin E_{32} + S_2' \sin E_2 - (Z_p + \dot{z}TF) \cos E_2 = 0 \quad (19)$$

$$D_{32} - D_3 \cdot 2 \sin^2 \frac{E_{32}}{2} - S_2' \cos E_2 - (Z_p + \dot{z}TF) \sin E_2 = 0 \quad (20)$$

where $$S_2' = S_3 \cdot 2 \sin^2 \frac{A_{32}}{2} - h + d \sin A_{32} + (X_p + \dot{x}TF) \cos A_2 + (Y_p + \dot{y}TF) \sin A_2 \quad (21)$$

When operating on hand set rates, switch 391, Fig. 13, is operated to the left. At spring pile-ups 7, 8, 9, 10, 11, connections 387, 411, 393, 421 and 402, respectively, as shown, are broken at the right break springs, and the corresponding connections to the summing amplifiers 351, 410, 417 and 395 are grounded by the left make springs.

This switches out the terms $$\frac{TF}{t}\left(D_1 \cos E_1 \cdot 2 \sin^2 \frac{A_{21}}{2}\right) \text{ in Equation 5;}$$

$$\frac{TF}{t}(D_1 \cos E_1 \sin A_{21}) \text{ in Equation 6;}$$

$$\frac{TF}{t}(D_1 \sin E_{21}) \text{ in Equation 7; and}$$

$$\frac{TF}{t}\left(D_1 \cdot 2 \sin^2 \frac{E_{21}}{2}\right) - \frac{TF}{t}D_{21} \text{ in Equation 8.}$$

The voltage selected by the wiper 355 proportional to $X_p$ causes a current to flow in resistor 357. The voltage selected by the wiper of potentiometer 428 proportional to $\dot{x}TF$ causes a current to flow through the left-hand springs of pile-up 2 of switch 391 through resistor 440. The combined currents of one phase proportional to $(X_p + \dot{x}TF)$ flow to ground through the right halves of the windings of potentiometers 359, 360.

The voltage selected by the wiper 356 proportional to $X_p$ causes a current to flow in resistor 358. The voltage selected by the wiper of potentiometer 427 proportional to $\dot{x}TF$ causes a current to flow through the left-hand springs of pile-up 1 of switch 391 through resistor 439. The combined currents of the other phase, proportional to $(X_p + \dot{x}TF)$, flow to ground through the left halves of the windings of potentiometers 359, 360.

The wiper 38 of potentiometer 359 selects a voltage proportional to $(X_p + \dot{x}TF) \cos A_2$ which is applied to an input resistor of the summing amplifier 395.

The voltage selected by the wiper 361 proportional to $Y_p$ causes a current to flow in resistor 363. The voltage selected by the wiper of potentiometer 430, proportional to $\dot{y}TF$ causes a current to flow through the left-hand springs of pile-up 4 of switch 391 and in resistor 442. The combined currents of one phase proportional to $(Y_p + \dot{y}TF)$ flow to ground through the right halves of the windings of potentiometers 365, 366.

The voltage selected by wiper 362, proportional to $Y_p$, causes a current to flow in resistor 364. The voltage selected by the wiper of potentiometer 429, proportional to $\dot{y}TF$, causes a current to flow through the left-hand springs of pile-up 3 and resistor 441. The combined currents of the other phase proportional to $(Y_p+\dot{y}TF)$ flow through the left halves of the windings of potentiometers 365, 366 to ground.

The voltage selected by the wiper of potentiometer 366, proportional to $(Y_p+\dot{y}TF) \sin A_2$ is applied to an input resistor of summing amplifier 395.

The connection 402 to summing amplifier 395 is grounded at pile-up 11 of switch 391.

The connection 403 applies a voltage proportional to $-h$ to the summing amplifier 395.

The wiper of potentiometer 398, Fig. 13, applies a voltage proportional to $$S_3 \cdot 2 \sin^2 \frac{A_{32}}{2}$$

to an input resistor of the summing amplifier 395.

The connection 405 applies a voltage proportional to $d \sin A_{32}$ to an input resistor of the summing amplifier 395.

The output of summing amplifier 395, proportional to $S_2'$, Equation 21, causes currents to flow to ground through the two halves of the winding of potentiometer 406. The wiper of potentiometer 406 is moved proportionately to $E_2$ to select a voltage $-S_2' \cos E_2$ which is applied to an input resistor of the summing amplifier 351.

The voltage selected by the wiper 367, Fig. 13, proportional to $Z_p$ causes a current to flow in resistor 369. The voltage selected by the wiper of potentiometer 432 proportional to $\dot{z}TF$ causes a current to flow through the left-hand springs of pile-up 6 of switch 391 and resistor 444. The combined currents of one phase proportional to $(Z_p+\dot{z}TF)$ flow to ground through the right-hand halves of the windings of potentiometers 371, 372.

The voltage selected by the wiper 368, proportional to $Z_p$ causes a current to flow in resistor 370. The voltage selected by the wiper of potentiometer 431, proportional to $\dot{z}TF$ causes a current to flow through the left-hand springs of pile-up 5 of switch 391 and resistor 443. The combined currents of the other phase proportional to $(Z_p+\dot{z}TF)$ flow to ground through the left-hand halves of the windings of potentiometers 371, 372.

The wiper 67 is moved proportionately to $E_2$ to select a voltage proportional to $-(Z_p+\dot{z}TF) \sin E_2$ which is applied to an input resistor of the summing amplifier 351.

The voltage selected by the wiper 164, Fig. 11, proportional to $$-D_3 \cdot 2 \sin^2 \frac{E_{32}}{2}$$

is applied by connection 165 to an input resistor of summing amplifier 351, Fig. 13.

The voltage selected by the wiper 20, Fig. 12, approximately equal to $D_{32}$, is applied by connection 348 to an input resistor of the summing amplifier 351, Fig. 13.

If the output of summing amplifier 351 is not equal to zero, the motor 18, Fig. 13, starts, moving the wiper 20, Fig. 12, to select a voltage which will reduce the output to zero, thus satisfying equation 20 and moving the wiper 20 to represent the correct value of $D_{32}$.

The connections 393 and 387 to the summing amplifier 351 are grounded by the switch 391.

The voltage selected by the wiper of potentiometer 372 proportional to $(Z_p+\dot{z}TF) \cos E_2$ is applied to an input resistor of the summing amplifier 410, Fig. 13.

The outputs of the summing amplifier, 395, Fig. 13, of 0 and $\pi$ phase, respectively, flow to ground through the two sections of the winding of potentiometer 413. The voltage selected by the wiper of potentiometer 413 proportional to $S_2' \sin E_2$, is applied to an input resistor of the summing amplifier 410.

The voltage selected by the wiper 162, Fig. 11 proportional to $D_3 \sin E_{32}$ is applied by connection 166 to an input resistor of the summing amplifier 410, Fig. 13.

If the output of the summing amplifier 410 is not equal to zero, the motor 73 will start, moving the wiper 162 until the output is reduced to zero, thus moving wiper 162 to a value of $E_{32}$ which satisfies Equation 19.

The connection 421 to summing amplifier 417, Fig. 13, is grounded by spring pile-up 10 of switch 391.

The voltage selected by the wiper of potentiometer 360, proportional to $(X_p+\dot{x}TF) \sin A_2$ is applied to an input resistor of the summing amplifier 417.

The voltage selected by the wiper of potentiometer 365 proportional to $Y_p+\dot{y}TF \cos A_2$ is applied to an input resistor of the summing amplifier 417.

The voltage selected by the wiper of potentiometer 415, proportional to $S_3 \sin A_{32}$ is applied by connection 416 to an input resistor of the summing amplifier 417.

The voltage selected by the wiper of potentiometer 418, Fig. 12, proportional to $d \cos A_{32}$ is applied by connection 419, to an input resistor of the summing amplifier 417, Fig. 13.

If the output of the summing amplifier 417 is not equal to zero, the motor 43 will start, moving the wipers of potentiometers 418, Fig. 12, and 415, Fig. 13, to make the output of the summing amplifier 417 equal zero, thus satisfying Equation 18. The wipers of potentiometers 418 and 415 are thus moved to the correct value of the angle $A_{32}$.

The hand set rates $\dot{x}, \dot{y}, \dot{z}$ have thus enabled the circuit to compute the correct values of the increments $D_{32}$, $E_{32}$ and $A_{32}$. As the approximate or exact observation of the present position of the target is continued during the period of operation on hand set rates, the corrections $D_{F3}$ and $E_{F3}$ are also correctly computed, thus the values of fuze number, quadrant elevation and azimuthal angle sent to the guns are correct.

SUMMING AMPLIFIER, FIG. 15

A plurality of voltages may be applied through the individual input resistors 501 to 506 to the control electrode of the vacuum tube 507. The vacuum tube 507 may be of any desired type, but, as a high gain is advantageous, is preferably a pentode. The suppressor grid may be connected to the cathode. A battery 508, or other suitable source, supplies current to the anode of tube 507 through the resistor 509 and to the screen grid through the potential divider formed by the resistors 510, 511 in series. The anode of tube 507 is coupled to the control electrode of tube 512 by the capacitor 515, shunted by the resistor 513 in series with the capacitor 514. The control electrode of tube 512 is grounded through resistor 516, shunted by resistor 517 in series with capacitor 518. A battery 519, or other suitable source, supplies current to the anode of tube 512 through the resistor 520 and to the screen grid through the potential divider formed by resistors 548, 549 in series. The tube 512 may also be a high gain pentode, with suppressor grid connected to the cathode. The anode of tube 512 is coupled to the control electrode of tube 521 by capacitor 522. The control electrode of tube 521 is grounded through resistor 528, shunted by resistor 529 in series with capacitor 530. Tube 521 should have a fairly large power output, and fairly low output impedance, and may conveniently be a triode. Power is supplied to the anode of tube 521 from a battery 523, or other suitable source, through the primary winding of the output transformer 524. If desired, the same source may be used for the output circuits of all the tubes. The cathodes of the tubes are heated in known manner from a convenient source of current (not shown).

The control grids of vacuum tubes 507, 512, 521 are biased in known manner by the cathode circuit resistors 525, 526, 527.

The present amplifier is for use with alternating currents of a single frequency, which vary in amplitude fairly slowly, so that the side-bands of frequency are quite narrow. The series resonant circuits formed by the capacitor 545 and the inductor 532; the capacitor 546 and the inductor 534; and the capacitor 547 and the inductor 536 are tuned to the mid-band frequency, thus reducing the local reverse feedback and maintaining the gain of the amplifier for the mid-band frequency at a high value. The capacitors 531, 533, 535 and the resistors 525, 526, 527 broaden the tuning of the tuned circuits to prevent cutting off the desired side-band frequencies. The capacitors 542, 543 reduce the side-bands in the over-all feedback path.

The secondary winding of transformer 524 is in two sections, connected in series, so that the voltage produced on the output connection 537, with respect to the common connection 539, is of opposite phase to the voltage produced on the output connection 538. The common connection 539 may be grounded.

The output transformer 524 is connected so that the voltage on connection 537 is of opposite phase to the resultant voltage applied to the control electrode of tube 507.

The resistors 540, 541 form a potential divider across the output circuit formed by the output connections 537, 539. Resistor 544, connected across the output circuit formed by the output connections 538, 539 equalizes the loads on the two sections of the secondary winding of transformer 524.

The voltage developed across resistor 540 is fed back through resistor 500 to form a reverse feedback.

The resistors 513, 517, 529 with capacitors 514, 518, 530 correct any undesired phase shifts due to the tubes or wiring, so that no over-all phase shift is produced.

Electrical addition may be accomplished by using the Kirchhoff relation $\Sigma i = 0$ at a node. The sources connected to the resistors 501 to 506 are all grounded. These sources tend to produce currents in the resistors 501 to 506, which unite in the common impedance from the control electrode of tube 507 to ground, to produce a voltage proportional to the algebraic sum of the currents. The interaction between the sources, caused by the common impedance, must be kept small. But a small coupling impedance introduces a large loss in the amplitude of the combined voltage requiring a high amplification, with a high noise level, to bring the combined voltage back to the proper value.

The necessary low coupling resistance, required amplification, stability and freedom of distortion may be obtained with a reverse feedback amplifier. The low coupling impedance and large loss of voltage are then artificial, in the sense that they are only due to a partial cancellation of the applied voltages by the feedback.

Let $e_g$ be the voltage applied to the control grid of tube 507; $e_0$ the voltage across resistor 540; $e_1$, $e_2$, etc., the voltages across resistors 501, 502, etc., and $r_0$ the resistance of resistor 500, $r_1$, $r_2$, etc., the resistances of resistors 501, 502, etc.; $i_0$ the current in resistor 500; and $i_1$, $i_2$, etc., the currents in resistors 501, 502, etc. As the gain is high, $\mu$ is very large compared to unity.

$$e_g = e_0 - i_0 r_0 = e_1 - i_1 r_1 = e_2 - i_2 r_2$$

$$i_0 + i_1 + i_2 + \ldots = 0$$

$$e_0 = -\mu e_g$$

$$e_0 = -\frac{e_1 \frac{r_0}{r_1} + e_2 \frac{r_0}{r_2} + \ldots}{1 + \frac{1}{\mu}\left[1 + \frac{r_0}{r_1} + \frac{r_0}{r_2} + \ldots\right]}$$

If the voltage amplification factor $\mu$ is large compared to the bracketed quantity, $$e_0 = -\left[e_1 \frac{r_0}{r_1} + e_2 \frac{r_0}{r_2} + \ldots\right]$$

The summation is not limited to a specific number of inputs, thus with $n$ input circuits $$e_0 = -\frac{\sum_{j=1}^{j=n} e_j \frac{r_0}{r_j}}{1 + \frac{1}{F}}$$

where $$F = \frac{\mu}{\sum_{j=0}^{j=n} \frac{r_0}{r_j}}$$

represents the return ratio or feedback of the amplifier. With $\mu = 6 \times 10^4$, and the ratio $$\frac{r_0}{r_j}$$

unity, with two circuits $(n=2) F = 2 \times 10^4$, thus $$1 + \frac{1}{F}$$

differs from unity by only .005 per cent.

The artificial coupling resistor at the input electrode of tube 507 is $$r = \frac{r_0}{1 + \mu}$$

If $r_0$ is of the order of one megohm, then $r$ is of the order of 17 ohms. As $r_1$, $r_2$, etc. may also be of the order of one megohm each, interaction is negligible.

Due to the reverse feedback, the amplifier is substantially free from distortion, and has a low output impedance. In effect, the amplifier is a zero impedance source impressing a voltage on the connected potentiometers. Thus, the resistance of the load, and variations in this resistance, have little effect on the accuracy of the voltages selected.

The vacuum tubes 558, 559, 560 and interstage coupling networks of the first three stages of the amplifier shown in Fig. 16 are substantially the same as the three stages shown in Fig. 15, thus only the differences need be described.

The summing amplifiers 324, 335, Fig. 12 and 351, 410, 417, Fig. 13, respectively, control servo-motors. Some of the potentiometers applying voltages to the input of the amplifier controlling the motor are controlled by the motor, thus, the whole system of potentiometer, amplifier and motor forms a closed loop. The mechanical properties of the system may be expressed in the analogous electrical quantities, then the whole system may be equalized, using the principles set forth in U. S. Patent 2,123,178, July 12, 1938, H. W. Bode.

For convenience, the feedback is taken from a cathode follower resistor 561, in the cathode return circuit of tube 560, to a similar resistor 562 in the cathode return circuit of tube 558.

The equalization is afforded by the network 563 in the feedback path. The tuned networks, such as 531, 532, 545, associated with the cathode resistors in Fig. 15, are omitted.

To supply enough power to operate the servo-motor the output transformer 564 feeds a push-pull stage, including tubes 565, 566, of conventional design. The secondary winding of the output transformer 567 is connected to one phase winding of the servo-motor.

When the summing amplifier of Fig. 16 is used, like the amplifiers 446, 456, 461, Fig. 14, to control a meter, the network 563 may be replaced by a simple impedance, such as a capacitor or resistor, and the power stage may be omitted.

SUPERVISORY CIRCUIT

Before selecting a "memory point" some precautions must be taken to insure that the computer is in condition to make an accurate computation. The observers of the range and of the azimuth and elevation angles of the target must be satisfied that the observed values are accurate. The D₂₁ wiper 16, Fig 4, the A₂₁ wiper 41, Fig. 5, the E₂₁ wiper 71, Fig. 6, and the wipers of the timing potentiometers 373, 374, Fig. 12 must be set at zero, and the E₁ wiper 72, Fig. 6, must be in angular coincidence with the E₂ shaft before the "memory point" is selected. Also, the "memory point" must be abandoned, and a new point selected, when either the D₂ wiper 14, Fig. 4, the D₂₁ wiper 16, Fig. 4, or the wipers of the timing potentiometers 373, 374, Fig. 12, have reached the end of their potentiometer winding.

The supervisory circuit of Fig. 17 insures that all precautions have been taken before the "memory point" is selected, and that the previous "memory point" is abandoned and a new "memory point" taken when necessary. During the time for selecting a "memory point" the computer operates on "hand set" rates.

A key or switch, such as key 601, Fig. 17, is located conveniently to each of the observers. When the observer is satisfied with the accuracy of his observation of the target, he closes key 601, permitting battery 602 to operate relay 603. The operation of relay 603 causes current to flow from battery 604 through signal lamp 605, and prepares a circuit from battery 606. The other observers similarly operate relays 607, 608, lighting lamps 609, 610 and further preparing the circuit from battery 606. The lamps 605, 609, 610 may be located at the computer, to indicate the observations are suitable for the selection of a "memory point."

The circuit from battery 606 is wired through the springs of relays 603, 607, 608, the cam operated switches 611, 612, 613, to be explained later, the reset key 614, winding of relay 615, the start key 616, and the back contacts of relays 617, 618, 619, 620, 621. If all the other contacts are closed and all of relays 617, 618, 619, 620, 621 are not operated, the relay 615 will operate to select a "memory point."

Relay 615 locks up through the springs of relays 603, 607, 608, cam springs 611, 612, 613 reset key 614 to ground at the third set of make springs of relay 615.

The operation of relay 615 closes a circuit from battery 604 lighting lamp 622 to indicate that a "memory point" has been selected.

The operation of relay 615 closes circuits from batteries 623, 624 through relays 625, 626 and hand set rate key 627 to ground at the first set of make springs of relay 615, operating relays 625, 626. The relays 625, 626 may conveniently replace the switch 391, Fig. 13, relay 625 operating spring pile-ups 1 to 6, and relay 626 operating spring pile-ups 7 to 11. If desired, more than two relays in parallel may be used. The operation of relays 625, 626, as previously explained in connection with key 391, Fig. 13, arranges the circuits so that the computation is based on the selected "memory point."

If operation on hand set rates is desired, even after the selection of a "memory point," as when the meters 454, 459, 466, Fig. 14, indicate a change of course, the key 627 may be operated releasing relays 625, 626 and switching the computing circuit of Fig. 13 to operation on hand set rates.

The start key 616 is operated at the start of a set of observations and, if desired, may be arranged to lock in the operated position during the operations.

Relay 617 is controlled by the off-normal springs 628 and indicates the condition of the E₁ wiper 72, Fig. 6.

The E₁ wiper 72, Fig. 6, must be driven in angular coincidence with the E₂ shaft 66, Fig. 6, until the "memory point" is selected. The E₂ shaft 66 drives the gear 669, which carries the off-normal springs 628, the armature 629, electromagnet 630, and directional springs 631. Before the selection of the "memory point," when relay 615 is in the non-operated condition, current from battery 632 is led by connections 633, 634 to electromagnet 630, which attracts pivoted armature 629, holding the upper end of the armature in a notch cut in the disc 635. The disc 635 is affixed to the shaft 636, thus the wiper 72 is driven in angular coincidence with the E₂ shaft 66. During this time, the off-normal springs 628 are open, the relay 617 is non-operated, and the operating circuit of relay 615 is prepared through the inner break springs of relay 617.

When relay 615 operates, the battery 632 is disconnected from connection 633 and connected to connection 637. The electromagnet 630 is deenergized, permitting the pivoted armature 629 to be driven out of the notch in the disc 635, closing the off-normal springs 628 and operating relay 617. The operation of relay 617 opens the operating circuit of relay 615, but relay 615 does not release, as it is locked up through the contacts of relays 603, 607, 608, cam switches 611, 612, 613 and reset key 614.

Current flows from battery 632, through connections 637, 638 to the winding of an electromagnetic brake 70, attached to the frame of the machine. The armature of the brake 70 is attached to the disc 635. When the winding of brake 70 is energized, the armature is drawn into contact with the stationary magnet, thus stopping the brush 72, shaft 636 and disc 635. The wiper 72 is thus stopped at the angle which the E₂ shaft had attained when the "memory point" was selected.

The drives of the D₂₁ wiper 16, Fig. 4, the A₂₁ wiper 41, Fig. 5, and the E₂₁ wiper 71, Fig. 6 are similar to the drive for the wipers of the timing potentiometers 373, 374, Fig. 12, so that only the drive of the timing potentiometers need be described.

The motor 640 is a simple synchronous motor, which may be of the type used in electric clocks. The motor 640 is connected to a source of alternating current of constant frequency, such as a commercial power supply, the oscillator 110, Fig. 11, or a separate constant frequency oscillator.

The motor 640 drives the gear 641, mounted on a shaft journalled in any convenient support, and the cylindrical armature 642. The winding 643 is mounted on the frame of the machine. The armature 644 is affixed to the shaft 645, which passes through the winding 643.

Before the "memory point" is selected, with the relay 615 deenergized, current flows from battery 632, through connections 633 and 646 and the winding of electromagnet 647, attached to the frame of the machine. Electromagnet 647 holds the pivoted armature 648 in a notch in the disc 649, thus holding the wipers of the potentiometers 373, 374 in the zero position.

When the "memory point" is selected and relay 615 operated, the electromagnet 647 is deenergized, permitting the armature 648 to be driven out of the notch in disc 649 and switching battery to connections 637, 650, energizing the winding 643, which draws the armatures 642, 644 together, causing motor 640 to drive the wipers.

When the pivoted armature 648 is driven out of the notch by the rotation of disc 649, the off-normal springs 651 are operated, operating relay 621.

The D₂₁, A₂₁ and E₂₁ wipers are similarly operated, except that the motor 640 is replaced by the appropriate driving shaft.

The computations on the selected "memory point" may continue until the wiper of potentiometer 373 reaches the end of its travel, after a lapse of some convenient time interval, say 90 seconds. The shaft 645 rotates the cam 652 which is arranged to open the cam operated springs 611 at the end of the travel of the wipers of the timing potentiometers. The cam springs 612, 613 are similarly opened at the end of the travel of the D₂₁, wiper 16, Fig. 4 and the D₂ wiper 14, Fig. 4.

When any of the cam springs 611, 612, 613 or the reset key 614, or any of the lower springs of relays 603, 607, 608 are opened, the locking circuit of relay 615 is opened, and relay 615 is released, releasing relays 625, 626 and switching the computation to the hand set rates, until a new "memory point" can be selected.

Before the new "memory point" can be selected, the E₁ wiper 72 must be moved into angular coincidence with the then position of the E₂ shaft.

The release of relay 615 disconnects battery 632 from connections 637, 638, deenergizing the brake 70, and connects battery 632 to connections 633, 634 energizing electromagnet 630. As relay 617 is operated through the off-normal springs 628, connection 633 is also extended through the springs of relay 617 to operate the electromagnetic clutch 654.

The release of relay 615 connects the source 655, which may be a source of commercial power or the oscillator 110, Fig. 11, through connection 656, springs of relay 617, connection 657 to the restoring motor 658. The cam operated springs 631 control the direction of rotation of motor 658 to drive the wipers 72 in the direction of least travel to come into coincidence with the E₂ shaft. The wiper 72, shaft 636 and disc 635 are driven by the motor 658, until the armature 629, which is under the influence of the energized electromagnet 630, can drop into the notch in the disc 635, thus securing angular coincidence between the wiper 72 and the E₂ shaft 66, and opening the off-normal springs 628.

Opening the off-normal springs 628 releases relay 617 which opens the circuits to the motor 658 and the clutch 654, releasing motor 658 from its connection to shaft 636 and permitting motor 658 to slow down and stop.

The release of relay 615 similarly deenergized the winding 643, energized the electromagnet 647 and the clutch 659, and supplied power to the motor 660, which, under the control of the directional cam switch 661, drives the shaft 645, disc 649 and wiper of potentiometer 373 back to zero, where the armature 648 drops into the notch of the disc 649, opening the off-normal springs 651, releasing relay 621, which opens the circuits to the clutch 659 and motor 660.

The restoration of the shaft 645 to the zero position causes the cam 652 to close the cam switch 611.

The D₂₁, A₂₁, E₂₁ shafts are similarly restored to normal.

When all the relays 617, 618, 619, 620, 621 have been released, a circuit is closed from battery 604 through lamp 662 and the relay contacts indicating that the drives are in position to select a new "memory point."

Thus, if the "memory point" was abandoned only due to one of the cam switches 611, 612, 613 having been operated, the circuit will automatically switch the computation to hand set rates, restore all drives to the proper condition, select a new "memory point" and then switch the computations to this new "memory point."

A similar result is attained if the reset key 614 is operated.

What is claimed is:

1. In a mechanism for indicating the azimuth angle, elevation angle, and distance from an observation point to the future position of a moving target, means rotated proportionally to continuous measurements of the azimuth angle, elevation angle and distance to said target, electromechanical means controlled by said rotations to derive quantities proportional to the linear increments during a measured time interval in the components in the directions of variations of said azimuth angle, elevation angle and slant distance, other electromechanical means controlled by said rotations and said quantities to rotate proportionately to the predicted linear increments in said components during the predicted time to travel from said point to the future position of said target, and mechanical means rotated conjointly by said first means and said latter means to indicate the azimuth angle, elevation angle and distance to the future position of said target.

2. In a mechanism for indicating the azimuth angle, quadrant elevation and fuze number to direct a shell from an observation point to burst at the predicted position of a moving target, first electromechanical means rotated proportionally to continuous measurements of the azimuth angle, elevation angle and slant range to said target, second electromechanical means controlled by said rotations to derive quantities proportional to the linear increments during a measured time interval in the components in the directions of variations of said azimuth angle, elevation angle and slant range, third electromechanical means controlled by said rotations and said quantities to rotate proportionally to the linear increments in said components during the time of flight of said shell, fourth electromechanical means controlled by said rotations and said quantities to rotate proportionally to the superelevation and the fuze number corrections and mechanical means rotated conjointly by said first, third and fourth means for indicating the azimuth angle, quadrant elevation and fuze number.

3. In a mechanism for indicating the azimuth angle, quadrant elevation and fuze number to direct a shell from an observation point to burst at a target, means rotated proportionally to continuous measurements of the slant range elevation angle and azimuthal angle of a moving target, electrical means for registering at a selected instant the size of the elevation angle, electrical means for registering the increments in slant range, elevation angle and azimuthal angle and the elapsed time since the selected instant, electrical means for computing from said registered increments the predicted increments in slant range, elevation angle and azimuthal angle during the computed time of flight of said shell to said target, electrical means for computing from said predicted increment in slant range the correction for fuze number, electrical means for computing from said predicted increment in elevation angle the correction for superelevation, mechanical means for adding the present value of slant range, the predicted increment in slant range and the fuze number correction to produce an indication proportional to the fuze number, mechanical means for adding the present value of elevation angle, the predicted increment in said angle and the superelevation to produce an indication proportional to quadrant elevation, and mechanical means for adding the present value of azimuthal angle and the predicted increment in said angle to produce an indication proportional to the predicted azimuthal angle.

4. In an artillery computer, a first shaft moved proportionally to the slant range from a gun to the present position of a target, a first servo-motor moved proportinally to the predicted increment in slant range to the future position of the target, a second shaft, mechanical means driven by said first shaft and said first servo-motor to move said second shaft proportionally to the sum of the movements of said shaft and said servo-motor, a second servo-motor moved proportionally to the difference between the predicted slant range and the fuse number, indicating means driven conjointly by said second shaft and said second servo-motor to indicate said fuze number, and electrical computing mechanism controlling both said servo-motors.

5. In an artillery computer, a first shaft moved proportionally to the elevation angle to the present position of a target, a servo-motor moving proportionally to the increment in elevation angle to the predicted position of said target, a second shaft moved conjointly by said first shaft and said servo-motor, a second servo-motor moved proportionally to the corrected superelevation, means indicating quadrant elevation moved conjointly by said second shaft and said second servo-motor and electrical computing mechanism controlling both said servo-motors.

6. A system for computing from the predicted values of slant range and elevation angle the ballistic factors required in directing a shell from a gun to a target including four sources of voltages varying as functions of the predicted slant range, eight voltages, two derived from each of said sources and all varying as functions of the predicted angle of elevation, and a resistance network energized by all said voltages to select and combine desired fractions of the voltages from said sources to produce voltages varying proportionally to the range and superelevation corrections for non-standard muzzle velocity of said gun, the range and superelevation corrections for non-standard air density, the correction for cross wind, the correction for drift, the correction for superelevation, the value of the time of flight of the shell, and the correction to express this value as a fuze number.

7. In an artillery computer, including mechanism moved in accordance with the predicted values of the slant range, and elevation angle from the gun to the target, a system for correcting the effect upon the computed time of flight of the shell of a non-standard muzzle velocity which includes a first source of voltage varying with the slant range, a second source of voltage varying as a function of the slant range and elevation angle, a third source of voltage varying as a function of slant range, a fourth source of voltage varying as a second function of the slant range and elevation angle, said sources being controlled by said mechanism, a resistance network connected to said four sources for combining desired fractions of said voltages to produce a fifth voltage, a sixth source of voltage varying as a second function of slant range, a seventh source of voltage varying as a third function of slant range, and elevation angle, said sources being controlled by said mechanism, a second resistance network connected to said sixth, seventh and eighth sources for combining desired fractions of said voltages to produce a ninth voltage, a transformer having a primary winding grounded at an intermediate tap, said fifth voltage being applied to one end of the primary winding and said ninth voltage applied to the other end of said winding, and a secondary winding and means for computing the time of flight connected to said secondary winding.

8. In an artillery computer, including mechanism moved in accordance with the predicted values of the slant range and elevation angle from the gun to the target, a system for correcting the effect upon the superelevation of the gun of a non-standard muzzle velocity which includes a transformer having a primary winding grounded at an intermediate tap and a secondary winding, a first grounded source of voltage varying as a function of slant range connected to one end of said primary winding, two grounded sources of voltages varying as separate functions of both slant range and elevation angle all said sources being controlled by said mechanism, a resistance network connected to said latter sources for combining desired fractions of said voltages to produce a fourth voltage applied to the other end of said primary winding and means for computing the superelevation of said gun connected to said secondary winding.

9. In an artillery computer including mechanism moved in accordance with the predicted values of the slant range and elevation angle from the gun to the target, a system for correcting the effect upon the computed time of flight of the shell of non-standard air density which includes a first source of voltage varying as a function of slant range, a second and a third source of voltage each varying as a function of both slant range and elevation angle, a resistance network connected to said three sources for combining desired fractions of said voltages to produce a fourth voltage with respect to ground, a fourth source of voltage varying with the slant range, a fifth source of voltage varying with a function of slant range, said five sources of voltages being controlled by said mechanism, a second resistance network connected to said fourth and fifth sources for combining desired fractions of said voltages to produce a sixth voltage with respect to ground, a transformer having a primary winding grounded at an intermediate point and a secondary winding, means for applying said fourth and sixth voltages respectively to the two ends of said primary winding and means for computing the time of flight of the shell connected to said secondary winding.

10. In an artillery computer including mechanism moved in accordance with the predicted values of the slant range and elevation angle from the gun to the target, a system for correcting the effect upon the computed superelevation of the gun of non-standard air density which includes a first source of voltage varying as a function of slant range, a second source of voltage varying as a function of both slant range and elevation angle, a first resistance network connected to both said sources for combining desired fractions of said voltages to produce a third voltage with respect to ground, three sources of voltages varying as independent functions of slant range and elevation angle, a second resistance network connected to all said latter sources for combining desired fractions of said voltages to produce a seventh voltage with respect to ground, said five sources of voltages being controlled by said mechanism, a transformer having a primary winding grounded at an intermediate point and a secondary winding means for applying said third and said seventh voltages respectively to the ends of the primary winding of said transformer, and means for computing the superelevation of said gun connected to said secondary winding.

11. In an artillery computer including a mechanism moved in accordance with the predicted values of the slant range and elevation angle from a gun to a target, a system for correcting the effect of cross wind upon the predicted values which includes a first source of voltage of one polarity varying as a function of slant range, a second source of voltage of opposite polarity varying as a function of both slant range and elevation angle, a resistance network connected to both said sources to combine desired fractions of said voltages to produce a third voltage varying with respect to ground, a third source of voltage of the first polarity varying with respect to ground with the slant range, a transformer having a primary winding grounded at an intermediate point and a secondary winding, means for applying said third voltage to one end of said primary winding and the voltage from said third source to the other end of said winding, and electrical computing means connected to said secondary winding.

12. In an artillery computer including mechanism moved in accordance with the slant range and elevation angle from a gun to a target, means for correcting for the drift of the shell including a source of voltage controlled by said mechanism to vary as a function of the horizontal range, a transformer having a primary winding connected to said source and a secondary winding, and electrical computing means connected to said secondary winding.

13. In an artillery computer including mechanism moved in accordance with the predicted slant range and elevation angle from a gun to a target, means for correcting for the lateral errors in the flight of the shell including a first source of voltage controlled by said mechanism to vary as a function of the horizontal range, a second source of voltage controlled by said mechanism to vary proportionally with the cross wind, a potentiometer having a winding varying in resistance per unit length with a sinusoidal function connected to said second source and a wiper adjusted to select a third voltage varying with the cross wind, a transformer having a primary winding connected to said first source of voltage and said wiper and a secondary winding, and electromechanical computing elements connected to said secondary winding.

14. A source of voltage proportional to the time of flight of a shell, a second source of voltage, means for reducing the voltage from said second source in the ratio of the increment in slant range along the line of fire during the time of flight of said shell to the component of the present slant range in the line of fire, means for selecting from said reduced voltage a voltage proportional to the dead time, and means for combining said selected voltage with the voltage from said first source.

15. In apparatus for correcting the indications of the time of flight of a shell from a gun to the predicted position of a target from observations of the slant range and elevation angle to the present position of the target and the predicted increments in slant range, elevation angle and azimuth angle during the time of flight of the shell, a source of a first voltage proportional to the predicted increment in slant range, means for selecting from said source a second voltage proportional to the slant range, a source of a third voltage proportional to the versed sine of the increment in elevation angle, a source of a fourth voltage proportional to the versed sine of the increment in azimuth angle, means for selecting from said fourth source a fifth voltage proportional to the square of the cosine of the elevation angle, means for combining said second, third and fifth voltages, means for selecting from said combined voltages a sixth voltage proportional to the dead time, a source of a seventh voltage proportional to the time of flight of the shell, and means to combine said sixth and seventh voltages to produce an eighth voltage proportional to the time of flight of the shell corrected for dead time.

16. In apparatus for correcting the indications of the time of flight of a shell from a gun to the predicted position of a target from observations of the slant range and elevation angle to the present position of the target, the predicted elevation angle of the target, and the predicted increments in slant range, elevation angle and azimuth angle during the time of flight of the shell, a source of a first voltage proportional to the quotient of the predicted increment in slant range divided by the present slant range, a source of a second voltage proportional to the versed sine of the predicted increment in elevation angle, a source of a third voltage proportional to the product of the versed sine of the increment in azimuth angle by the cosine of the elevation angle and by the cosine of the predicted elevation angle, means for combining said voltages, means for selecting from said combined voltages a fourth voltage proportional to the dead time, a source of a fifth voltage proportional to the time of flight of the shell, and means to combine said fourth and fifth voltages to produce a voltage proportional to the corrected time of flight.

17. In an artillery computer, a source of voltage varying with the ballistic correction for horizontal cross wind, a transformer having a primary winding connected to said source and a secondary winding grounded at an intermediate point, two potentiometers having windings respectively connected between the ends of said secondary winding and ground and two wipers adjusted to the value of the horizontal wind, a potentiometer having a single continuous circular winding varying in resistance with a complete sinusoidal function connected at two diametrically opposite points to said wipers, the equidistant intermediate pointers of said winding being grounded, and a wiper moved proportionally to the angle between the bearing of the wind and the predicted bearing of the target to select a voltage proportional to the component of the wind crosswise of the line of fire.

18. In an artillery computer, two equal sources of voltages of opposite polarity varying with the ballistic correction for cross wind, a potentiometer having a single continuous, circular winding varying in resistance with a complete sinusoidal function connected at two diametrically opposite points respectively to said sources and a wiper adjusted proportionally to the angle between the bearing of the wind and the predicted bearing of a target, and electrical computing means connected to said wiper.

19. In an electrical computer, means for generating a voltage proportional to the time of flight of a shell from a gun to the predicted position of a target including mechanism moved proportionally to the slant range and elevation angle of the predicted position of the target, four sources of voltages respectively varying as different functions of both the slant range and the elevation angle, a resistance network connected to all said sources for combining desired fractions of said voltages to produce a fifth voltage, a source of a sixth voltage varying directly with slant range, a source of a seventh voltage varying with a function of slant range, all said sources being controlled by said mechanism, a source of an eighth voltage varying with the range correction for non-standard muzzle velocity, a source of a ninth voltage varying with the range correction for non-standard air density, a source of a tenth voltage varying with the horizontal range component of the wind, means connected to the source of said tenth voltage to select an eleventh voltage varying as a function of the elevation angle, and thermionic means for adding said fifth, sixth, seventh, eighth, ninth and eleventh voltages to produce a voltage proportional to the time of flight of the shell.

20. In a system for checking from an observation point the constancy of movement of an object in a system of rectangular coordinates referred to the plane of the observation point, a source of voltage varying with a predicted time interval, a first potentiometer having a winding connected to said source and a first wiper moved proportionally to an elapsed time interval, second potentiometer means connected to said first wiper and having a second wiper moved to select a voltage proportional to the increment in one of said coordinates during said elapsed time, computing means controlled by the observations at said point and controlling said source and the movement of said second wiper, meter means connected to said second wiper, a third potentiometer having a winding connected to said source and a wiper connected to said meter means and adjusted to initially produce equality of the voltages supplied to said meter means, whereby inconstancy in the movement of said object produces inequality of said voltages and an indication by said meter means.

21. In an artillery computer for directing a shell to a target, mechanism controlled by observations of said target to move proportionally to the slant range to said target, and the increments in slant range, a source of voltage varying with the predicted time of flight of the shell, a variable resistor having a winding connected to said source and a first wiper moved proportionally to elapsed time, a first potentiometer having a winding connected to said first wiper and a second wiper moved by said mechanism proportionally to the increment in slant range during said elapsed time, a second potentiometer having a winding connected to said first wiper and a third wiper adjusted by said mechanism proportionally to the slant range prior to said elapsed time, to select a voltage proportional to the slant range prior to said elapsed time multiplied by the ratio of said time of flight to said elapsed time, and two resistors in serial relationship connected from said second wiper to said third wiper, whereby the junction of said resistors has a potential proportional to the present slant range multiplied by the ratio of the time of flight to the elapsed time.

22. In an artillery computer for directing a shell to a target, mechanism controlled by observations of said target to move proportionally to the slant range to said target and the increments in slant range, a grounded source of voltage varying with the predicted time of flight of the shell, a variable resistor having a winding connected to said source and a first wiper moved proportionally to elapsed time, a first potentiometer having a winding connected to said first wiper and a second wiper moved by said mechanism proportionally to the increment in slant range during said elapsed time, a first thermionic amplifier having an input circuit connected to said wiper and an output circuit of two polarities balanced with respect to ground, a second potentiometer having a winding connected to said first wiper and a third wiper adjusted by said mechanism proportionally to the slant range prior to said elapsed time, a second thermionic amplifier having an input circuit connected to said third wiper and an output circuit of two polarities balanced with respect to ground, the output voltage of said second amplifier being proportional to the slant range prior to said elapsed time multiplied by the ratio of said time of flight to said elapsed time, a pair of resistors in serial relationship connected to the output circuits of one polarity of both said amplifiers and another pair of resistors in serial relationship connected to the output circuits of the other polarity of both said amplifiers, whereby the potentials of the junctions of said pairs of resistors are proportional to the present slant range to the target multiplied by the ratio of said time of flight to said elapsed time.

23. In a system for checking the constancy of movement of a target, including mechanism moved proportionally to the azimuth angle and elevation angle of said target, a first source of voltage proportional to the slant distance to said target at a past time multiplied by the ratio between a predicted period of time and the time elapsed since said past time, a first potentiometer having a winding varying in resistance with a sinusoidal function connected to said source and a first wiper adjusted by said mechanism proportionally to the elevation angle at the past time, a second potentiometer having a winding varying in resistance with a cosinusoidal function connected to said first wiper and a second wiper moved by said mechanism proportionally to the increment in azimuth angle during said elapsed time, a third potentiometer having a winding varying in resistance with a sinusoidal function connected to said second wiper and a third wiper moved by said mechanism proportionally to the azimuth angle, a fourth potentiometer having a winding varying in resistance with a coversed sinusoidal function connected to said first wiper and a fourth wiper moved by said mechanism proportionally to the increment in azimuth angle during said elapsed time, a second source of voltage varying with the slant distance to said target multiplied by the ratio of said predicted time to said elapsed time, a fifth potentiometer having a winding varying in resistance with a sinusoidal function connected to said second source and a fifth wiper moved by said mechanism proportionally to the elevation angle, a thermionic amplifier having an input circuit connected to said first, fourth and fifth wipers and an output circuit, a sixth potentiometer having a winding varying in resistance with a sinusoidal function connected to said output circuit and a sixth wiper moved by said mechanism proportionally to the azimuth angle, meter means connected to said third and sixth wipers, a third source of voltage varying proportionally to said predicted time interval, a seventh potentiometer having a winding connected to said third source of voltage and a wiper connected to said meter means and adjusted to balance the voltages from said third and sixth wipers, whereby a variation in the reading of said meter means indicates a lack of constancy in the movement of said target.

24. In a system of checking the constancy of movement of a target, including mechanism moved proportionally to the elevation angle of said target, a first source of voltage proportional to the slant range to said target multiplied by the ratio of a predicted time and an elapsed time, a first potentiometer having a winding varying in resistance with a cosinusoidal function connected to said source and a first wiper moved by said mechanism proportionally to the elevation angle, a second source of voltage proportional to the slant range to said target at a past time multiplied by the ratio of said predicted time and said elapsed time since said past time, a second potentiometer having a winding varying in resistance with a cosinusoidal function connected to said second source and a wiper adjusted by said mechanism to the elevation angle at said past time, meter means connected to said wipers, a third source of voltage varying with said predicted time, a third potentiometer having a winding connected to said third source and a third wiper connected to said meter means and adjusted to select a voltage balancing the voltages from the other wipers whereby a variation in the reading of said meter means indicates inconstancy in the movement of said target.

25. In an artillery computer for directing a shell from a gun to a moving target including mechanism controlled from an observation station to move proportionally to the slant range, elevation angle and azimuth angle of said target from said station, a source of a first voltage, a first potentiometer having a winding connected to said source and a first wiper moved by said mechanism to select a voltage proportional to the predicted slant range to said target, a second potentiometer having a winding connected to said first wiper and a second wiper moved by said mechanism to select a voltage proportional to the versed sine of the predicted increment in elevation angle, a source of a fourth voltage proportional to the vertical parallax from said station to said gun, a third potentiometer having a winding connected to the source of said fourth voltage and a third wiper moved by said mechanism to select a voltage proportional to the sine of the elevation angle, a source of a sixth voltage proportional to the slant range to said target at a selected past time multiplied by the ratio of the predicted time of flight of said shell to said target to the time elapsed since said past time, a fourth potentiometer having a winding connected to the source of said sixth voltage and a fourth wiper moved by said mechanism to select a voltage proportional to the versed sine of the increment in elevation angle since said past time, a source of an eighth voltage proportional to the $x$ coordinate of the parallax from said station to said gun, a fifth potentiometer having a winding connected to the source of said eighth voltage and a fifth wiper moved by said mechanism to select a voltage proportional to the cosine of the azimuth angle, a source of a tenth voltage proportional to the $y$ coordinate of the parallax from said station to said gun, a sixth potentiometer having a winding connected to the source of said ninth voltage and a sixth wiper moved by said mechanism to select a voltage proportional to the sine of the azimuth angle, a source of a twelfth voltage proportional to the predicted horizontal range to the future position of said target, a source of a thirteenth voltage proportional to the horizontal wind, a seventh potentiometer having a winding connected to the source of said thirteenth voltage and a seventh wiper adjusted to select a fourteenth voltage proportional to the cosine of the angle between the azimuth angle of the wind and the predicted azimuth angle of the target, means for combining said twelfth and fourteenth voltages forming a source of a fifteenth voltage, an eighth potentiometer having a winding connected to the source of said fifteenth voltage and an eighth wiper moved by said mechanism to select a voltage proportional to the versed sine of the predicted increment in azimuth angle, a ninth potentiometer having a winding connected to said sixth source of voltage and a ninth wiper adjusted by said mechanism to select a sixteenth voltage proportional to the sine of the elevation angle at said past time, a tenth potentiometer having a winding connected to said ninth wiper and a tenth wiper moved by said mechanism to select a seventeenth voltage proportional to the versed sine of the increment in azimuth angle since said past time, an eleventh wiper of said seventh potentiometer moved by said mechanism to select an eighteenth voltage proportional to the sine of the angle between the azimuth angle of the wind and the predicted azimuth angle of the target, a source of a nineteenth voltage proportional to the drift of the shell, means for combining said eighteenth voltage with said nineteenth voltage to form a source of a twentieth voltage, a twelfth potentiometer having a winding connected to the source of said twentieth voltage and a twelfth wiper moved by said mechanism to select a voltage proportional to the sine of the predicted increment in azimuth angle, means connected to said fifth, sixth, eighth, tenth, seventh, and twelfth wipers to combine the selected voltages to form a source of a twenty-first voltage, a thirteenth potentiometer having a winding connected to the source of said twenty-first voltage and a thirteenth wiper moved by said source to select a voltage proportional to the cosine of the angle of elevation, a motor, a fourteenth potentiometer having a winding connected to said first source and a fourteenth wiper moved by said motor, a source of a twenty-second voltage proportional to the slant range multiplied by the ratio of said time of flight to said elapsed time, and means connected to said second, third, fourth, and thirteenth wipers and said latter source to add said voltages to form a voltage controlling said motor to move said fourteenth wiper to make said voltage zero, whereby the movement of said fourteenth wiper is proportional to the predicted increment in slant range from the present to the future position of the target.

26. In an artillery computer for directing a shell from a gun to a moving target including mechanism controlled from an observation point to move proportionally to the slant range, elevation angle and azimuth angle of said target from said point, a source of voltage proportional to the vertical parallax from said point to said gun, a first potentiometer having a winding connected to said source and a first wiper moved by said mechanism to select a voltage proportional to the cosine of the elevation angle, a source of a second voltage proportional to the slant range at a past time multiplied by the ratio of the predicted time of flight of the shell to the target to the elapsed time since said past time, a second potentiometer having a winding connected to the source of said second voltage and a second wiper moved by said mechanism to select a voltage proportional to the sine of the increment in elevation angle since said past time, a third potentiometer having a winding connected to the source of said second voltage and a third wiper adjusted to select a voltage proportional to the sine of the elevation angle at said past time, a fourth potentiometer having a winding connected to said third wiper and a fourth wiper moved by said mechanism to select a voltage proportional to the versed sine of the increment in azimuth angle since said past time, a source of a third voltage proportional to the $x$ coordinate of the parallax from said point to said gun, a fifth potentiometer having a winding connected to the source of said third voltage and a fifth wiper moved by said mechanism to select a voltage proportional to the cosine of the azimuth angle, a source of a fourth voltage proportional to the $y$ coordinate of the parallax from said point to said gun, a sixth potentiometer having a winding connected to the source of said fourth voltage and a sixth wiper moved by said mechanism to select a voltage proportional to the sine of the elevation angle, a source of a fifth voltage proportional to the horizontal range to said target, a source of a sixth voltage proportional to the wind, a seventh potentiometer having a winding connected to the source of said sixth voltage and a seventh wiper adjusted to select a voltage proportional to the cosine of the angle between the azimuth angles of said target and the wind, means for adding the voltages from the source of said fifth voltage and said seventh wiper, an eighth potentiometer having a winding connected to said adding means and an eighth wiper moved by said mechanism proportionally to the the versed sine of the predicted increment in said azimuth angle, a source of a seventh voltage proportional to the drift of the shell, a ninth wiper of said seventh potentiometer adjusted to select a voltage proportional to the sine of the angle between the azimuth angles of said target and the wind, other means for adding the voltage selected by said ninth wiper and said seventh voltage, a tenth potentiometer having a winding connected to said other means and a tenth wiper moved by said mechanism proportionally to the sine of the predicted increment in azimuth angle, means connected to said fourth, fifth, sixth, seventh, eighth, ninth, tenth wipers to combine the selected voltages and form a source of an eighth voltage, an eleventh potentiometer having a winding connected to the source of said eighth voltage and an eleventh wiper moved by said mechanism proportionally to the sine of the elevation angle, a motor, a source of a ninth voltage proportional to the predicted slant range, a twelfth potentiometer having a winding connected to the source of said ninth voltage and a twelfth wiper moved by said motor and means connected to said first, second, eleventh and twelfth wipers to add the selected voltages to produce a voltage controlling said motor to move said twelfth wiper to make the sum of said voltages zero, whereby said wiper is moved proportionally to the predicted increment in elevation angle from the present to the future position of the target.

27. In an artillery computer for directing a shell from a gun to a moving target including mechanism controlled from an observation station to move proportionally to the slant range, elevation angle and azimuth angle of said target from said station, a source of a first voltage proportional to the $x$ coordinate of the parallax from said station to said gun, a first potentiometer having a winding connected to said source and a first wiper moved by said mechanism to select a voltage proportional to the sine of the azimuth angle, a source of a second voltage proportional to the $y$ coordinate of said parallax, a second potentiometer having a winding connected to said second source and a second wiper moved by said mechanism to select a voltage proportional to the cosine of the azimuth angle, a source of a third voltage proportional to the slant range at a past time multiplied by the ratio of the predicted time of flight of said shell to the elapsed time since said past time, a third potentiometer having a winding connected to the source of said third voltage and a third wiper adjusted by said mechanism to select a voltage proportional to the cosine of the elevation angle at said past time, a fourth potentiometer having a winding connected to said third wiper and a fourth wiper moved by said mechanism to select a voltage proportional to the sine of the increment in azimuth angle since said past time, a source of a fourth voltage proportional to the predicted horizontal range to said target, a source of a fifth voltage proportional to the horizontal wind, a fifth potentiometer having a winding connected to the source of said fifth voltage and a fifth and a sixth wiper moved by said mechanism to respectively select voltages proportional to the cosine and to the sine of the angle between the azimuth angle of the wind and the predicted azimuth angle of the target, means for adding the voltage selected by said fifth wiper and said fourth voltage, a motor, a sixth potentiometer having a winding connected to said voltage adding means and a seventh wiper moved by said motor to select a voltage proportional to the sine of the predicted increment in azimuth angle, a source of a sixth voltage proportional to the drift of the shell, other means for adding the voltage selected by said sixth wiper and said sixth voltage, a seventh potentiometer having a winding connected to said other means and an eighth wiper moved by said motor to select a voltage proportional to the cosine of the predicted increment in azimuth angle, and means connected to said first, second, fourth, seventh and eighth wipers to add the selected voltages to produce a voltage controlling said motor to move said seventh and eighth wipers to make the sum of said voltages zero, whereby said wipers are moved proportionally to the predicted increment in azimuth angle from the present to the future position of the target.

28. Mechanism for directing a shell from a gun to the predicted position of a target controlled by measurements taken at an observation station indicating the positions of the target at a selected past time, the present time and a predicted time in a system of coordinates having the directions of increments in the slant distance, elevation angle and azimuth angle from said station to said target, adjustable sources of first voltages varying as the increments in said coordinates during the predicted time interval, sources of second voltages adjusted to be proportional to the increments in said coordinates from said station to said gun, sources of third voltages proportional to the increments in said coordinates during the elapsed time interval multiplied by the ratio of the predicted time interval to the elapsed time interval, sources of fourth voltages adjusted to be proportional to the rates of change in said coordinates multiplied by the predicted time interval, switching means for, at will, combining said first, second and third voltages or said first, second and fourth voltages and motor means associated with said mechanism and connected to said switching means to adjust said first voltages to make the sums of said voltages zero.

29. A system for predicting the movement, during a predicted time interval, of a target with respect to a gun, including mechanism controlled by measurements taken at an observation station of the movement of the target, during an elapsed time interval, along a coordinate having the direction of an increment in the slant distance from said station to said target, an adjustable source of a first voltage varying approximately as the increment in said coordinate during the predicted time interval, a source of a second voltage adjusted to be proportional to the increment in said coordinate from said station to the gun, a source of a third voltage proportional to the increment in said coordinate during the elapsed time interval multiplied by the ratio of the predicted time interval to the elapsed time interval, a source of a fourth voltage adjusted to be proportional to the rate of change of said coordinate multiplied by the predicted time interval, switching means for, at will, combining said first, second and third, or said first, second and fourth voltages, and a motor associated with said mechanism and connected to said switching means to adjust said first voltage to make the sum of said voltages zero, whereby the movement of said motor is proportional to the predicted change in said coordinate.

30. A system for predicting the movement during a predicted time interval, of a target with respect to a gun including mechanism controlled by measurements, taken at an observation station during an elapsed time interval, of the movement of the target along a coordinate having the direction of an increment in the elevation angle of said target from said station, an adjustable source of a first voltage varying approximately as the increment in said coordinate during the predicted time interval, a source of a second voltage adjusted to be proportional to the increment in said coordinate from said station to said gun, a source of a third voltage proportional to the increment in said coordinate during the elapsed time interval multiplied by the ratio of the predicted time interval to the elapsed time interval, a source of a fourth voltage adjusted to be proportional to the rate of change in said coordinate multiplied by said predicted time interval, switching means for, at will, combining said first, second and third voltages or said first, second and fourth voltages and a motor associated with said mechanism and connected to said switching means to adjust said first voltage to make either of the sums of said voltages equal zero, whereby the movement of said motor is proportional to the predicted change in said elevation angle.

31. A system for predicting the movement, during a predicted time interval, of a target with respect to a gun, including mechanism controlled by measurements taken at an observation station of the movement of the target, during an elapsed time interval, along a coordinate having the direction of an increment in the azimuth angle of said target from said station, an adjustable source of a first voltage varying approximately as the increment in said coordinate during the predicted time interval, a source of a second voltage adjusted to be proportional to the increment in said coordinate from said station to said gun, a source of a third voltage proportional to the increment in said coordinate during the elapsed time interval multiplied by the ratio of the predicted time interval to the elapsed time interval, a source of a fourth voltage adjusted to be proportional to the rate of change in said coordinate multiplied by said predicted time interval, switching means for, at will, combining said first, second and third voltages or said first, second and fourth voltages and a motor associated with said mechanism and connected to said switching means to adjust said first voltage to make either of the sums of said voltages equal zero, whereby the movement of said motor is proportional to the predicted change in said azimuth angle.

32. In a system for directing a shell from a gun to the predicted position of a target, mechanism controlled by measurements of slant range, elevation angle and azimuth angle taken at an observation station to predict the position of the target after a predicted time interval in a system of coordinates having the directions of increments in the slant range elevation angle and azimuth angle, a first potentiometer having a wiper moved by said mechanism proportionately to the elevation angle at a selected past time, a second potentiometer having a second wiper moved by said mechanism proportionally to the slant range, third, fourth and fifth potentiometers having third, fourth and fifth wipers moved by said mechanism, respectively, proportionally to the increments in slant range, elevation angle and azimuth angle since said past time, a sixth potentiometer having a sixth wiper moved proportionally to the elapsed time interval since said past time, contact springs operated by said mechanism when either of said second, third or sixth wipers is moved to the end of its travel, off-normal springs associated with each of said first, third, fourth, fifth and sixth wipers, adjustable sources of first voltages varying approximately as the increments in said coordinates during said predicted time interval, sources of second voltages adjusted to be proportional to the increments in said coordinates from said station to said gun, sources of third voltages proportional to the increments in said coordinates during said elapsed time interval multiplied by the ratio of the predicted time interval to the elapsed time interval, sources of fourth voltages adjusted to be proportional to the rates of change in said coordinates multiplied by the predicted time interval, means, including switching means, for normally combining said first, second and fourth voltages, and, when operated, for combining said first, second and third voltages, motor means associated with said mechanism and connected to said combining means to adjust said first voltages to make the sums of said voltages zero, and an operating circuit for said switching means serially connecting all of said contact springs and all of said off-normal springs.

References Cited in the file of this patent

UNITED STATES PATENTS

| | | |
|---|---|---|
| 2,065,303 | Chafee et al. | Dec. 22, 1936 |

FOREIGN PATENTS

| | | |
|---|---|---|
| 164,765 | Great Britain | June 23, 1921 |